US 6,582,169 B1

(12) United States Patent
Cano-Rodriguez et al.

(10) Patent No.: US 6,582,169 B1
(45) Date of Patent: Jun. 24, 2003

(54) CARGO RETAINER DEVICE

(75) Inventors: Adalberto Cano-Rodriguez, 201 Walnut St., Salida, CO (US) 81201; Pamela Cano-Rodriguez, Salida, CO (US)

(73) Assignee: Adalberto Cano-Rodriguez, Salida, CO (US)

( * ) Notice: Subject to any disclaimer, the term of this patent is extended or adjusted under 35 U.S.C. 154(b) by 0 days.

(21) Appl. No.: 09/683,632

(22) Filed: Jan. 29, 2002

(51) Int. Cl.$^7$ .................................................. B60P 7/15
(52) U.S. Cl. ........................ 410/128; 410/122; 410/127; 410/140; 410/143; 410/151
(58) Field of Search ................................ 410/122, 127, 410/128, 123, 124, 129, 140, 142, 143, 151, 145; 296/24.1, 37.6; 220/529, 530, 553; 224/403, 42.33, 42.34

(56) References Cited

U.S. PATENT DOCUMENTS

| | | | |
|---|---|---|---|
| 2,594,208 A | 4/1952 | Pilot | |
| 3,880,394 A | 4/1975 | Wisecarver | |
| 3,995,565 A | 12/1976 | Kersey | |
| 4,121,849 A | * 10/1978 | Christopher | 410/38 |
| 4,236,854 A | 12/1980 | Rogers | |
| 4,737,056 A | 4/1988 | Hunt | |
| 4,772,165 A | * 9/1988 | Bartkus | 410/139 |
| 4,797,043 A | * 1/1989 | Williams, Jr. | 410/145 |
| 4,834,599 A | 5/1989 | Gorden et al. | |
| D326,076 S | 5/1992 | Wiese | |
| 5,281,063 A | * 1/1994 | Austin, III | 410/151 |
| 5,427,486 A | 6/1995 | Green | |
| 5,472,301 A | 12/1995 | Wallen | |
| 5,697,742 A | * 12/1997 | House | 410/127 |
| D394,640 S | 5/1998 | Pestone | |
| 5,769,293 A | 6/1998 | Zaretsky | |
| 5,769,580 A | 6/1998 | Purvis | |
| 5,934,850 A | * 8/1999 | Soumar et al. | 410/155 |
| 5,971,685 A | * 10/1999 | Owens | 410/151 |
| 5,975,819 A | * 11/1999 | Cola | 410/129 |
| 5,988,962 A | * 11/1999 | Santa Cruz et al. | 410/151 |
| 6,039,521 A | 3/2000 | Sullivan | |
| 6,042,312 A | * 3/2000 | Durham, II | 410/143 |
| 6,068,433 A | * 5/2000 | Baloga | 410/145 |
| 6,077,007 A | * 6/2000 | Porter et al. | 410/140 |
| 6,238,154 B1 | * 5/2001 | DaPrato | 410/151 |

OTHER PUBLICATIONS

Custom Cargo, Inc., Buddy Bar (Product description) Company Website, 7 pages.
Loading Zone, LLC, Original Cargo Gate, Company Website, 2 page.

* cited by examiner

*Primary Examiner*—Stephen T. Gordon
(74) *Attorney, Agent, or Firm*—Roger A. Jackson

(57) ABSTRACT

A cargo retainer device and method adapted for mounting within a cargo container having an end wall, an opposite parallel pivoted end wall defining a container length therebetween, two opposite parallel side walls defining a container width therebetween, and a floor. The cargo retainer device is adapted to be interposed between cargo in the container and either the end wall, sidewall, or the floor to inhibit movement of the cargo during transit. The cargo container includes a first extension member, a second extension member perpendicularly oriented to the first extension member, and screw threads to facilitate an increase in the first and second extension member lengths to contact against the respective container walls and floor. A lockable element secures the screw threads on the first extension member to restrict theft of the cargo retainer device from the container and addition of a cargo divider assembly can further prevent cargo movement.

22 Claims, 8 Drawing Sheets

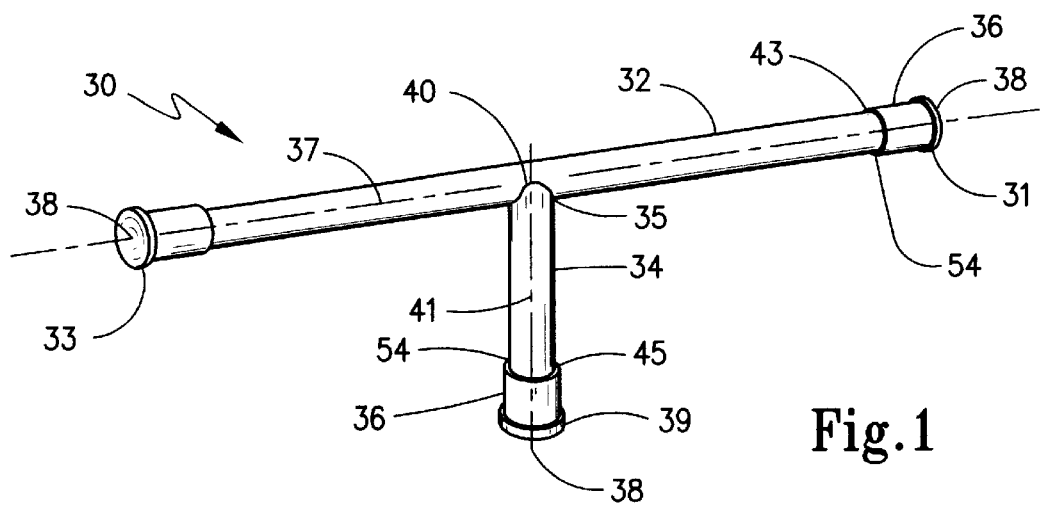
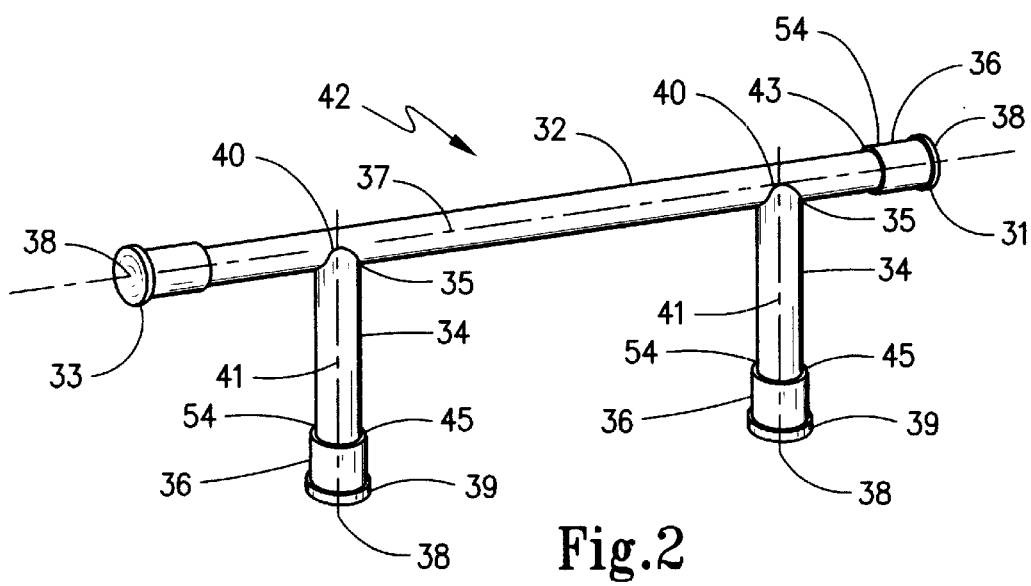
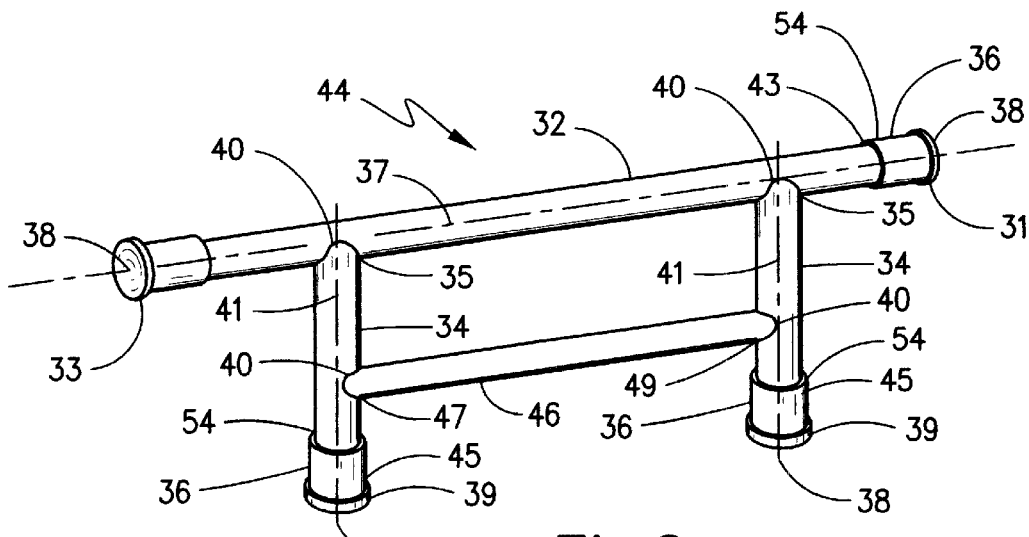

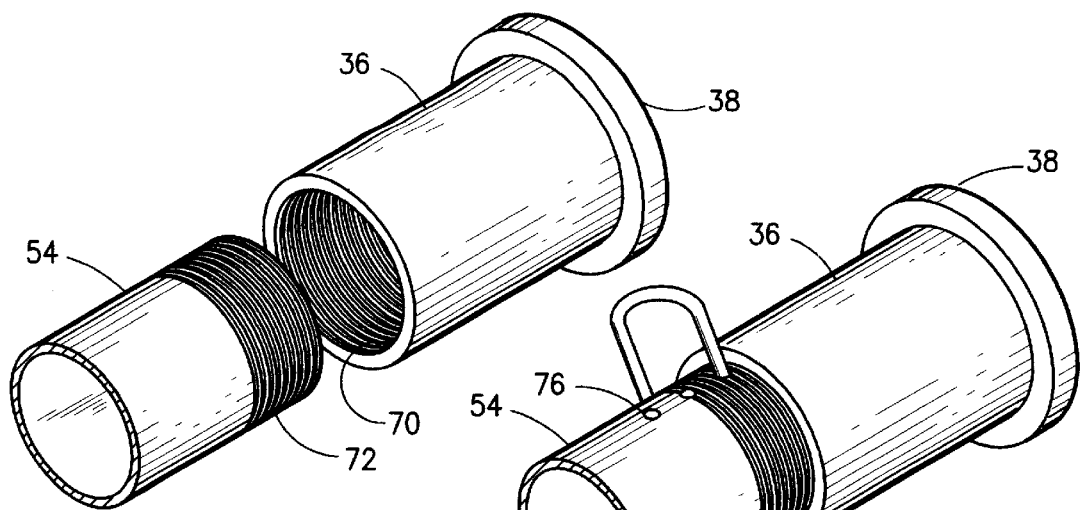
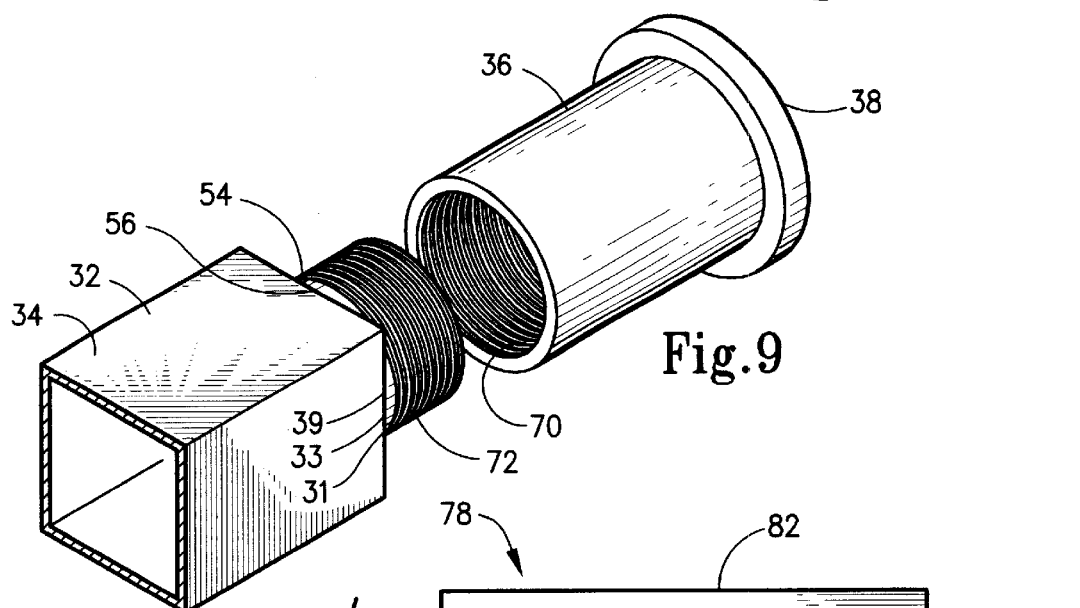
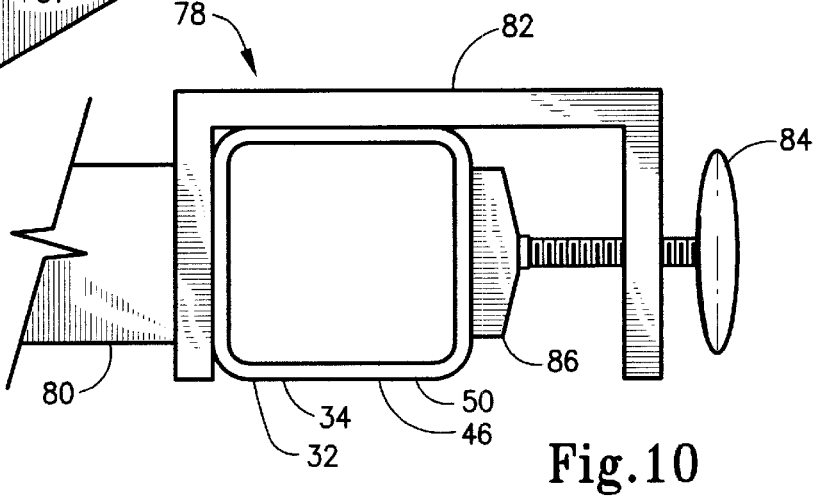

CARGO RETAINER DEVICE

TECHNICAL FIELD

The present invention relates generally to a device, which is employed to prevent cargo, which is being transported, from shifting during transit. More specifically, the present invention relates to the field of cargo transport in light duty trucks that have an open cargo area, wherein the shifting of cargo during transit can cause damage to the cargo. In particular, the present invention concerns the bracing of cargo in a pickup truck bed both laterally in the direction of travel and perpendicular to the direction to travel and also vertically to prevent the shifting of the cargo transported therein.

BACKGROUND OF INVENTION

Industrialized countries rely upon transportation systems such as over the road trucks, trains, airplanes, and boats for distribution and transportation of both large objects and balky commodities. It is important to the safety of the transportation vehicle, whether it be a truck, car, boat, or train, and to the safety of the cargo that is transported, that the cargo is stabilized while being transported. If the cargo shifts or moves during transport, the cargo can be damaged and the inside of the cargo container can also be damaged. Further, if the cargo is not sufficiently stabilized to avoid shifting, the cargo can potentially unbalance the vehicle and create a dangerous situation. For example, if a vehicle is loaded so that the cargo is distributed evenly in the cargo area of the vehicle and the cargo shifts its location dramatically while vehicle is traveling, for instance during the negotiation of a curve, the shifting cargo can potentially upset the vehicles center of gravity to such an extent to possibly cause the driver of the vehicle to lose control of the vehicle.

To avoid cargo shifting, cargos are packed as carefully as possible in the container to eliminate any open spaces within the cargo to minimize the possibility of a cargo shifting. In many circumstances, however, that with the specific type of cargo or the nature and size or bulk of the cargo are such that the cargo container in which the cargo is to be packed, results in open spaces within the cargo container, especially in the case of the cargo container being partially filled with cargo which is a quite common occurrence. This is especially true where the cargo was heavy, or of such a unique shape such as a piece of cargo that is very long and narrow, that the cargo container may be at a best compromise to contain the cargo and retain it securely. In order to secure the open regions of the cargo container, it is desirable to provide some sort of restraint device between the cargo and the walls of the cargo bed. These types of cargo retention devices need to be constructed to withstand the shifting forces typically encountered during transport of the cargo. Likewise, they must also be relatively lightweight and preferably capable of adapting to any number of size differences that exist between the various cargo containers. It is also desired that the cargo retention device is easily portable and movable and readily securable within the cargo container space thus allowing the cargo retention device to be easily installed or removed from the cargo containing area.

Focusing specifically on light duty trucks and their respective cargo containers and more particularly in relation to a pickup truck beds the aforementioned problem has been well recognized in the proper art. Typically, a single bar has been used that mounts laterally across the pickup truck bed being mounted lengthwise being perpendicular to the direction of truck travel and is secured in the pickup truck bed by being expandable or extendible in a lateral direction with pads on each end of the bar to create friction with the side walls of the pickup truck bed. One such example is in U.S. Pat. No. 4,737,056 issued to Hunt which discloses an extendable brace bar for securing cargo in a pickup truck bed. The extendable portion of the bar is accomplished by typically screw threads to allow the bar to be gradually extended in length to brace against the pickup truck bed. The focus of Hunt is for the lateral bracing of cargo in the pickup truck bed primarily having been designed to prevent the shifting of cargo in the direction of vehicle travel, although Hunt does have some alternative embodiments that also brace laterally in a perpendicular manner to the direction of vehicle travel. Hunt does not have any provision for bracing the cargo in a vertical manner. Another similar example is in U.S. Pat. No. 5,769,580 issued to Purvis that discloses a shift stick device being similar to Hunt with the exception that the extension mechanism is a mechanical ratcheting type as opposed to the screw extension mechanism of Hunt. Also, U.S. Pat. No. 5,769,293 issued to Zaretsky discloses a device is similar to the combination of Hunt and Purvis by combining a screw adjustment mechanism with a ratchet cam mechanism to extend the bar which is shown specifically for use in a car trunk. Again, Zaretsky only braces the cargo against a lateral load in the direction of vehicle travel. A similar cargo retention device is disclosed in U.S. Pat. No. 5,472,301 issued to Wallen that utilizes a lateral extension bar with a ratcheting mechanism and screw length adjustment on each end. U.S. Pat. No. 4,834,599 issued to Gordon et al. discloses a truck bed divider that has a singular Screw extension mechanism in the middle of its lengthwise length again only bracing against lateral cargo movement in the direction of a vehicle travel.

Another approach in the prior art has been the use of a net that is highly flexible being secured against the pickup truck bed sidewalls, with the net being mounted again perpendicular to the direction of vehicle travel and thus only bracing the cargo against lateral movement in the direction of the travel. Examples would be in U.S. Pat. No. 6,039,521 issued to Sullivan and U.S. Pat. No. 5,427,486 issued to Green. One other derivative of a cargo retention device is an extensible telescoping cargo brace that utilizes springs to expand against the pickup truck bed sidewalls appearing similar to a ladder on its side as disclosed in U.S. Pat. No. 3,995,565 issued to Kersey that again only braces the cargo against lateral movement in the direction of vehicle travel.

Although the aforementioned cargo retention devices are generally suitable for use in retaining cargo for shipment in the cargo container, they are generally more limited in their application in use to only bracing the cargo in a lateral movement parallel to the direction of vehicle travel. Accordingly, there remains a need for an improved cargo retention device that has the added capabilities of taking a vertical cargo load with the ability to handle abnormally shaped objects that is also lightweight and inexpensive. In addition, there is a need for a cargo retention device that can be easily secured in the pickup truck bed and be lockable to prevent theft of either the cargo or the cargo retention device, as most pickup truck beds are exposed to the ambient environment making the cargo and cargo retainer an easy opportunity for theft.

SUMMARY OF INVENTION

It is an object of the present invention to provide a new and useful cargo retention device that is quick and easy to install into the pickup truck bed and be removed from the pickup truck bed.

Another object of the present invention is to provide a cargo retention device that can support a vertical load placed on top of the cargo retention device.

Yet another object of the present invention is to provide a cargo retention device that does not require permanent attachment to the cargo walls of the container or to the walls of the truck bed.

Still yet another object of the present invention is to provide a cargo retention device that can brace cargo laterally in all directions and vertically within or adjacent to the container or the truck bed.

Yet still another object of the present invention is to provide for attachments to the cargo retention device that facilitate securing abnormally shaped cargo to the cargo container or the truck bed.

According to the present invention, then, a cargo retainer device is provided that adapted to be mounted within a cargo container that has an end wall, an opposite parallel pivoted end wall defining a container length therebetween, two opposite parallel side walls defining a container width therebetween, and a floor. The cargo retainer device is adapted to be interposed between cargo placed in the container for shipment and either the end wall, sidewall, and the floor to inhibit movement of the cargo during transit. Broadly the present invention of a cargo retainer device includes, a first extension member having a first end and a second end, with the first extension member having a lengthwise axis extending between the first and second ends. Also included is a second extension member that has a proximal end and an opposite distal end, the second extension member having an axial axis extending between the proximal and distal ends, the second extension member axial axis intersects the first extension member lengthwise axis in an approximately perpendicular relationship such that the proximal end is adjacent to the first extension member between the first and second ends. In addition, a means to facilitate movement of the first extension member along the lengthwise axis to increase the distance between the first and second ends such that the first and second ends engage opposing cargo container walls and a means to facilitate movement of the second extension member along the axial axis to increase the distance between the proximal and distal ends such that the distal end engages the cargo container floor.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 1 is a perspective view of first exemplary embodiment of the cargo retention device shown with a first extension member and a second extension member;

FIG. 2 is a perspective view of a second exemplary embodiment of the cargo retention device shown with a first extension member and two-second extension members;

FIG. 3 is a perspective view of a third exemplary embodiment of the cargo retention device shown with a first extension member, a first transverse frame member, and two second extension members;

FIG. 7 is a perspective view of the screw extension mechanism disassembled for clarity;

FIG. 8 is a perspective view of the screw extension mechanism that is assembled and shown in use with a lock that prevents the screw extension mechanism from retracting in length;

FIG. 9 is a perspective view of the screw extension mechanism disassembled for clarity as applied to the embodiments shown in FIGS. 5 and 6;

FIG. 10 is an end view of the cargo divider assembly that can be attached to the structure of the cargo retention device;

REFERENCE NUMBER IN DRAWINGS

Figure 4:
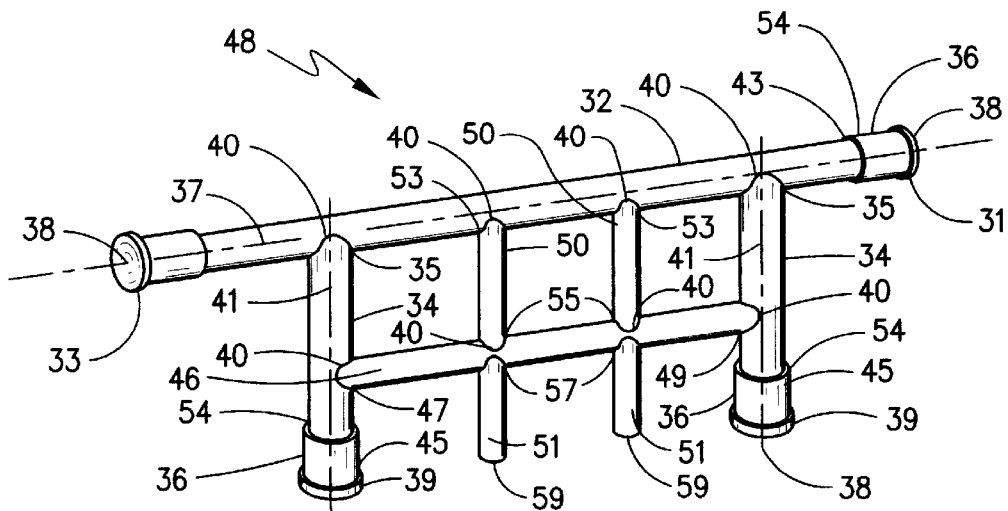
FIG. 4 is a perspective view of a fourth exemplary embodiment of the cargo retention device shown with a first extension member, a first transverse frame member, two second extension members, and two second transverse frame extension members.

30 A first exemplary embodiment of the cargo retention device
31 First extension member second end
32 First extension member
33 First extension member first end
34 Second extension member
35 Second extension member proximal end
36 Threaded extension sleeve
37 First extension member lengthwise axis
38 Anti slip element
39 Second extension member distal end
40 Means for attaching frame members
41 Second extension member axial axis
42 A second exemplary embodiment of the cargo retention device
43 Means to facilitate movement of first extension member length increase
44 A third exemplary embodiment of the cargo retention device
45 Means to facilitate movement of second extension member length increase
46 First transverse frame member
47 First transverse frame member first edge
48 A fourth exemplary embodiment of the cargo retention device
49 First transverse frame member second edge
50 Second transverse frame member
51 Second transverse frame extension member
52 A fifth exemplary embodiment of the cargo retention device
53 Second transverse frame member first termination point
54 Threaded extension shaft
55 Second transverse frame member second termination point
56 Means for attaching extension shaft to frame
57 Second transverse frame extension member first tip
59 Second transverse frame extension member second tip
66 A sixth exemplary embodiment of the cargo retention device
70 Internal threads
72 External threads
74 Lockable element
76 Lock aperture
78 Cargo divider assembly
80 Cargo divider assembly extension
82 Cargo divider frame
84 Thumbscrew
86 Base thumbscrew
88 Truck
90 Container end wall
91 Pivoted end wall
92 Flat cargo
94 Container sidewall
96 Container floor
98 Cargo net
100 Washing machine
102 Long cargo

DETAILED DESCRIPTION

The present invention relates generally to a device, which is employed to prevent cargo, which is being transported, from shifting during transit. More specifically, the present invention relates to the field of cargo transport in light duty trucks that have an open cargo area, wherein the shifting of cargo during transit can cause damage to the cargo. In particular, the present invention concerns the bracing of cargo in a pickup truck bed both laterally in the direction of travel and perpendicular to the direction to travel and also vertically to prevent the shifting of the cargo transported therein.

According to the present invention, then, a cargo retainer device is provided that is adapted to be mounted within a cargo container that has an end wall, an opposite parallel pivoted end wall defining a container length therebetween, two opposite parallel side walls defining a container width therebetween, and a floor. The cargo retainer device is adapted to be interposed between cargo placed in the container for shipment and either the end wall, sidewall, and the floor to inhibit movement of the cargo during transit. Broadly the present invention of a cargo retainer device includes, a first extension member having a first end and a second end, with the first extension member having a lengthwise axis extending between the first and second ends. Also included is a second extension member that has a proximal end and an opposite distal end, the second extension member having an axial axis extending between the proximal and distal ends, the second extension member axial axis intersects the first extension member lengthwise axis in an approximately perpendicular relationship such that the proximal end is adjacent to the first extension member between the first and second ends. In addition, a means to facilitate movement of the first extension member along the lengthwise axis to increase the distance between the first and second ends such that the first and second ends engage opposing cargo container walls and a means to facilitate movement of the second extension member along the axial axis to increase the distance between the proximal and distal ends such that the distal end engages the cargo container floor.

All of the embodiments of the present invention are used to restrain cargo. With initial reference to FIG. 1 shown is a perspective view of a first exemplary embodiment of the cargo retention device with a first extension member and a second extension member. Starting with first exemplary embodiment of the cargo retention device assembly 30, a first extension member 32 having a first extension member lengthwise axis 37 including a first extension member first end 33 and a first extension member second end 31 wherein the first extension member lengthwise axis 37 extends between the first extension member first end 33 and the first extension member second end 31 is shown. The first extension member 32 also includes a means to facilitate movement 43 of the first extension member 32 along the first extension member lengthwise axis 37 to increase the distance between the first extension member first end 33 and the first and extension member second end 31 being for the ultimate purpose of engaging the first end 33 and the second end 31 with the opposing cargo container walls. This secures the first extension member between the opposing cargo container walls. It is preferred that for manufacturing simplicity and minimal cost that the means to facilitate movement 43 of the first extension member 32 be only on either the first end 33 or the second end 31 of the first extension member 32. As only a lengthwise increase in distance is required along the lengthwise axis 37 a singular means to facilitate movement 43 will accomplish the desired purpose as mentioned above. As an option, having the means to facilitate movement 43 of the length increase of the first extension member 32 the means to facilitate movement 43 could also be on both the first end 33 and on the second end 31. The means to facilitate movement 43 is accomplished in a preferred manner by the utilization of a threaded extension sleeve 36 that has an internal threaded portion that threadably engages an external thread 54 either on the first end 33 or the second end 31 of the first extension member 32. The preferred means to facilitate movement 43 is shown in more detail in FIG. 7, FIG. 8, and FIG. 9. The lengthwise increase of the first extension member 32 is accomplished by manually rotating the threaded extension sleeve 36 wherein the threaded extension sleeve 36 rotates in a manner to increase the overall length of the first extension member 32 along the lengthwise axis 37. In addition, it is preferred that the threaded extension sleeve 36 have an anti slip element 38 that is the interface contact engaging the opposing cargo container walls for the purpose of increasing the frictional resistance between the threaded extension sleeve 36 and the cargo container walls to better secure the first extension member to the opposing cargo container walls. Preferably, the anti slip element 38 is a soft resilient block that will be deformed under the use of the means to facilitate movement 43 of the first extension member 32 to increase its length along lengthwise axis 37, thereby accommodating any surface irregularities of the opposing cargo container walls and also to protect the surface finish of the opposing cargo container walls. The anti slip element 38 is constructed of a weather resistant rubber material. Alternatively, the anti slip element 38 could be constructed of nylon, leather, or a synthetic material wherein the requirement of the anti slip element 38 deforming while under the loading from the means to facilitate movement 43 along the lengthwise axis 37 of the first extension member 32 into the opposing cargo container walls is met. Note that the anti slip element 38 is also on the first end 33 or on the second end 31 in the case of the means to facilitate movement 43 being on only the first end 33, or on the second end 31, wherein the anti slip element 38 is on the end opposite of the means to facilitate movement 43 end. The means to facilitate movement 43 could be accomplished by a number of alternative methods such as spring loading, a ratcheting type mechanism, or any manner of a hydraulic or pneumatic system wherein the result would be to increase the distance between the first end 33 and the second end 31 along the lengthwise axis 37 of the first extension member 32 while having an appropriate amount of axial loading force against the cargo container walls.

The first exemplary embodiment of the cargo retention device 30 also includes a second extension member 34 having a proximal end 35 and an opposite distal end 39. The second extension member 34 also has an axial axis 41 that extends between the proximal end 35 and the distal end 39. The second extension member 34 also includes a means to facilitate movement 45 of the second extension member 34 along the axial axis 41 to increase the distance between the proximal end 35 and the distal end 39 such that the distal end 39 engages the cargo container floor when the cargo retention device 30 is in the assembled state as shown. The means to facilitate movement 45 of the second extension member 34 is accomplished in the same manner as the means to facilitate movement 43 of the first extension member 32 as previously described. In addition, it is preferred that the threaded extension sleeve 36 have an anti slip element 38 that is the interface contact engaging the cargo floor for the purpose of increasing the frictional resistance between the threaded extension sleeve 36 and the cargo floor to better secure the second extension member 34 to the cargo container floor. Preferably, the anti slip element 38 is a soft resilient block that will be deformed under the use of the means to facilitate movement 45 of the second extension member 34 to increase its length along the axial axis 41, thereby accommodating any surface irregularities of the cargo container floor and also to protect the surface finish of the cargo container floor. The anti slip element 38 is constructed of a weather resistant rubber material. Alternatively, the anti slip element 38 could be constructed of nylon, leather, or a synthetic material wherein the requirement of the anti slip element 38 deforming while under the loading from the means to facilitate movement 45 along the axial axis 41 of the second extension member 34 into the cargo container floor is met. The orientation between the first extension member 32 and the second extension member 34 is such that the second extension member 34 is in an approximately perpendicular relationship with the first extension member 32 in that the second extension member axial axis 41 intersects the first extension member lengthwise axis 37 in an approximately perpendicular relationship. This results in the proximal end 35 being adjacent to the first extension member 32 between the first end 33 and the second end 31. The means 40 for attaching the first extension member 32 and the second extension member 34 is preferably accomplished by having an affixed connection by welding or alternatively by brazing or soldering. Other methods of affixing the connection between the first extension member 32 and the second extension member 34 are by press or shrink fitting the two members together. However, any number of alternative means 40 for attaching the first extension member 32 and the second extension member 34 could be used. These include a detachable connection such as a threaded connection, a nut and bolt connection, the use of a bracket with nuts and bolts between the first extension member 32 and a second extension member 34, or a slotted or dovetail arrangement between the first extension member 32 in the second extension member 34 that maintains the approximately perpendicular orientation as previously described.

Figure 5:
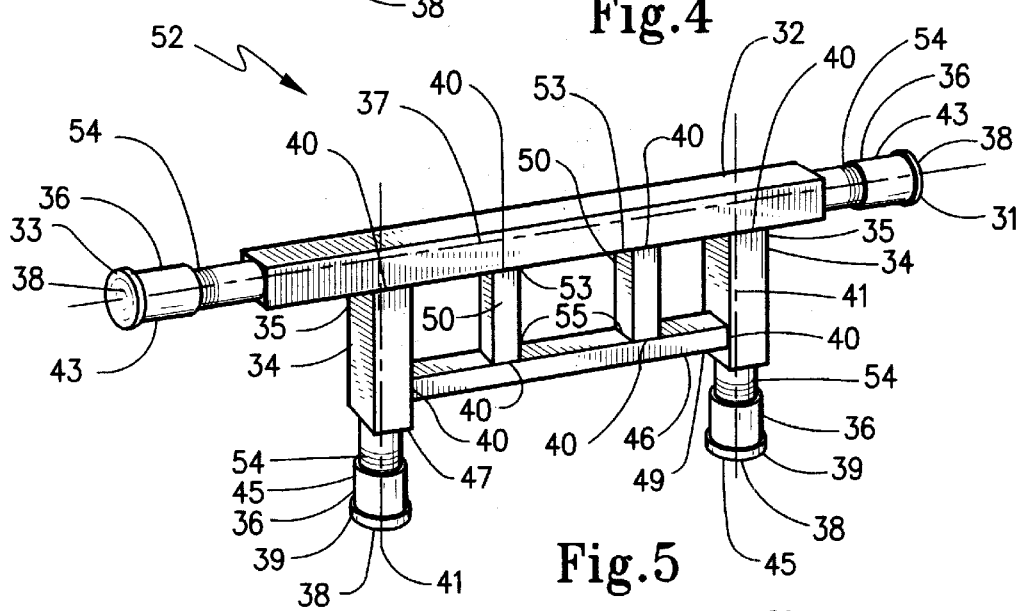
FIG. 5 is a perspective view of a fifth exemplary embodiment of the cargo retention device with a first extension square tubing member, a first transverse square tubing member, two second extension square tubing members, and two second transverse square tubing members.
Figure 6:
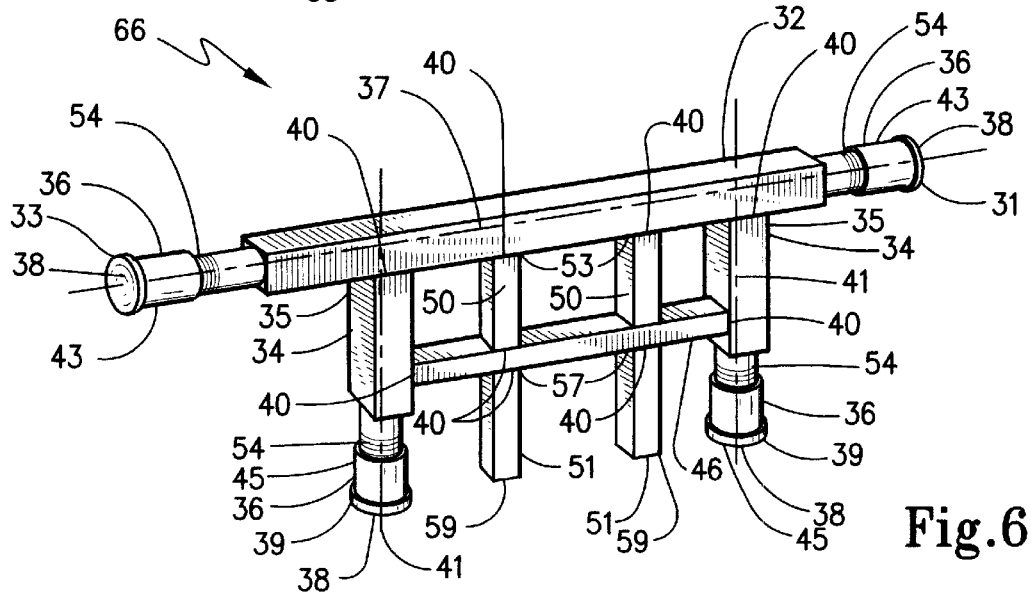
FIG. 6 is a perspective view of a sixth exemplary embodiment of the cargo retention device with a first extension square tubing member, a first transverse square tubing member, two second extension square tubing members, two second transverse square tubing members, and two second transverse square tubing extension members.

The materials for construction of both the first extension member 32 and the second extension member 34 are preferably a square structural tubing material being carbon steel, however, stainless steel or aluminum would be acceptable materials also. The square structural tubing is desired to be a one and one quarter inch by a one and one quarter inch square by 16 gauge in thickness for size. Alternatively, the materials for construction of both the first extension member 32 and the second extension member 34 could be a round structural tubing material being also of carbon steel, with stainless steel or aluminum being acceptable. The round structural tubing would be one and one-quarter inches in diameter by a one eighth inch wall thickness in size. Other materials and sizes of structural materials that have similar strength characteristics of the aforementioned materials of construction would also be acceptable such as plastics or composites. FIGS. 1, 2, 3, and 4 show the use of the round structural tubing for the cargo retainer device and FIGS. 5 and 6 show the use of the square structural tubing for the cargo retainer device. In using the preferred material of the square structural tubing an additional element of a threaded extension shaft 54 would be required to allow for a threadably matable engagement with the threaded extension sleeve 36, in accomplishing both the means to facilitate movement 43 and the means to facilitate movement 45, detail of this assembly is shown in FIG. 9.

In order to accommodate a number of different sized cargo containers specifically concerning pickup truck cargo beds, there are four different sizes of the cargo retention device assembly 30, however, these size accommodations would apply to all embodiments disclosed for the cargo retention device. The adjustable range in length of the first extension member 32 between the first end 33 and the second end 31, wherein the means to facilitate movement 43 operates within, has a series of four operating ranges for a series of various size standard pickup bed widths. These width ranges are a first range of sixty five inches to seventy one inches, a second range of sixty one inches to sixty seven inches, a third range of fifty six inches to sixty two inches, and a fourth range of forty nine inches to fifty five inches. In addition, the nominal midpoint length of the second extension member 34 between the proximal end 35 and the distal end 39 wherein the means to facilitate movement 45 is at its middle adjustment, correspond to the aforementioned ranges one through four is as follows. Ranges one and two are thirteen and one quarter inches and for ranges three and four are eleven and one quarter inches. Note that even though the previously described different size ranges applied to standard pickup truck cargo beds, other types of containers could utilize the cargo retainer device 30 as long as the requirements of having a cargo container that has an end wall, an opposite parallel pivoted end wall defining a container length therebetween, two opposite parallel side walls defining a container width therebetween, and a floor. Thus, any general shipping container that meets these requirements could utilize the cargo retention device 30 to be mounted within for the purpose of inhibiting movement of the cargo during transit.

Moving next to FIG. 2 a perspective view of a second exemplary embodiment of the cargo retention device is shown with a first extension member and two-second extension members. The second exemplary embodiment of the cargo retention device assembly 42, a first extension member 32 having a first extension member lengthwise axis 37 including a first extension member first end 33 and a first extension member second end 31 wherein the first extension member lengthwise axis 37 extends between the first extension member first end 33 and the first extension member second end 31 is shown. The first extension member 32 also includes a means to facilitate movement 43 the first extension member 32 along the first extension member lengthwise axis 37 to increase the distance between the first extension member first end 33 and the first and extension member second end 31 being for the ultimate purpose of engaging the first end 33 and the second end 31 with the opposing cargo container walls. This secures the first extension member between the opposing cargo container walls. It is preferred that for manufacturing simplicity and minimal cost that the means to facilitate movement 43 the first extension member 32 be only on either the first end 33 or the second end 31 of the first extension member 32. As only a lengthwise increase in distance is required along the lengthwise axis 37 a singular means for urging 43 will accomplish the desired purpose as mentioned above. As an option, having the means to facilitate movement 43 of the length increase of the first extension member 32 the means to facilitate movement 43 could also be on both the first end 33 and on the second end 31. The means to facilitate movement 43 is accomplished in a preferred manner by the utilization of a threaded extension sleeve 36 that has an internal threaded portion that threadably engages an external thread 54 either on the first end 33 or the second end 31 of the first extension member 32. The preferred means to facilitate movement 43 is shown in more detail in FIG. 7, FIG. 8, and FIG. 9. The lengthwise increase of the first extension member 32 is accomplished by manually rotating the threaded extension sleeve 36 wherein the threaded extension sleeve 36 rotates in a manner to increase the overall length of the first extension member 32 along the lengthwise axis 37. In addition, it is preferred that the threaded extension sleeve 36 have an anti slip element 38 that is the interface contact engaging the opposing cargo container walls for the purpose of increasing the frictional resistance between the threaded extension sleeve 36 and the cargo container walls to better secure the first extension member to the opposing cargo container walls. Preferably, the anti slip element 38 is a soft resilient block that will be deformed under the use of the means to facilitate movement 43 of the first extension member 32 to increase its length along lengthwise axis 37, thereby accommodating any surface irregularities of the opposing cargo container walls and also to protect the surface finish of the opposing cargo container walls. The anti slip element 38 is constructed of a weather resistant rubber material. Alternatively, the anti slip element 38 could be constructed of nylon, leather, or a synthetic material wherein the requirement of the anti slip element 38 deforming while under the loading from the means to facilitate movement 43 along the lengthwise axis 37 of the first extension member 32 into the opposing cargo container walls is met. Note that the anti slip element 38 is also on the first end 33 or on the second end 31 in the case of the means to facilitate movement 43 being on only the first end 33 or on the second end 31, wherein the anti slip element 38 is on the end opposite of the means to facilitate movement 43 end. The means to facilitate movement 43 could be accomplished by a number of alternative methods such as spring loading, a ratcheting type mechanism, or any manner of a hydraulic or pneumatic system wherein the result would be to increase the distance between the first end 33 and the second end 31 along the lengthwise axis 37 of the first extension member 32 while having an appropriate amount of axial loading force against the cargo container walls.

The second exemplary embodiment of the cargo retention device 42 also includes a plurality of second extension members 34 each having a proximal end 35 and an opposite distal end 39. The second extension members 34 each also have an axial axis 41 that extends between the proximal end 35 and the distal end 39. The second extension members 34 each also include a means to facilitate movement 45 of the second extension member 34 along the axial axis 41 to increase the distance between the proximal end 35 and the distal end 39 such that the distal end 39 engages the cargo container floor when the cargo retention device 42 is in the assembled state as shown. The means to facilitate movement 45 of each second extension member 34 is accomplished in the same manner as the means to facilitate movement 43 of the first extension member 32 as previously described. In addition, it is preferred that the threaded extension sleeve 36 have an anti slip element 38 that is the interface contact engaging the cargo floor for the purpose of increasing the frictional resistance between the threaded extension sleeve 36 and the cargo floor to better secure the second extension members 34 to the cargo container floor. Preferably, the anti slip element 38 is a soft resilient block that will be deformed under the use of the means to facilitate movement 45 of the second extension member 34 to increase its length along the axial axis 41, thereby accommodating any surface irregularities of the cargo container floor and also to protect the surface finish of the cargo container floor. The anti slip element 38 is constructed of a weather resistant rubber material. Alternatively, the anti slip element 38 could be constructed of nylon, leather, or a synthetic material wherein the requirement of the anti slip element 38 deforming while under the loading from the means to facilitate movement 45 along the axial axis 41 of the second extension member 34 into the cargo container floor is met. The orientation between the first extension member 32 and the second extension members 34 is such that each second extension member 34 is in an approximately perpendicular relationship with the first extension member 32 in that each second extension member axial axis 41 intersects the first extension member lengthwise axis 37 in an approximately perpendicular relationship. This results in the proximal ends 35 being adjacent to the first extension member 32 between the first end 33 and the second end 31. The means 40 for attaching the first extension member 32 and the second extension members 34 is preferably accomplished by having an affixed connection by welding or alternatively by brazing or soldering. Other methods of affixing the connection between the first extension member 32 and the second extension members 34 are by press or shrink fitting the multiple members together. However, any number of alternative means 40 for attaching the first extension member 32 and the second extension members 34 could be used. These include a detachable connection such as a threaded connection, a nut and bolt connection, the use of a bracket with nuts and bolts between the first extension member 32 and the second extension members 34, or a slotted or dovetail arrangement between the first extension member 32 in the second extension members 34 that maintains the approximately perpendicular orientation as previously described.

The materials for construction of both the first extension member 32 and the second extension members 34 are preferably a square structural tubing material being carbon steel, however, stainless steel or aluminum would be acceptable materials also. The square structural tubing is desired to be a one and one quarter inch by a one and one quarter inch square by 16 gauge in thickness for size. Alternatively, the materials for construction of both the first extension member 32 and the second extension members 34 could be a round structural tubing material being also of carbon steel, with stainless steel or aluminum being acceptable. The round structural tubing would be one and one-quarter inches in diameter by a one eighth inch wall thickness in size. Other materials and sizes of structural materials that have similar strength characteristics of the aforementioned materials of construction would also be acceptable such as plastics or composites. FIGS. 1, 2, 3, and 4 show the use of the round structural tubing for the cargo retainer device and FIGS. 5 and 6 show the use of the square structural tubing for the cargo retainer device. In using the preferred material of the square structural tubing an additional element of a threaded extension shaft 54 would be required to allow for a threadably matable engagement with the threaded extension sleeve 36, in accomplishing both the means to facilitate movement 43 and the means to facilitate movement 45, detail of this assembly is shown in FIG. 9.

In order to accommodate a number of different sized cargo containers specifically concerning pickup truck cargo beds, there are four different sizes of the cargo retention device assembly 42, however, these size accommodations would apply to all embodiments disclosed for the cargo retention device. The adjustable range in length of the first extension member 32 between the first end 33 and the second end 31, wherein the means to facilitate movement 43 operates within, has a series of four operating ranges for a series of various size standard pickup bed widths. These width ranges are a first range of sixty five inches to seventy one inches, a second range of sixty one inches to sixty seven inches, a third range of fifty six inches to sixty two inches, and a fourth range of forty nine inches to fifty five inches. In addition, the nominal midpoint length of the second extension members 34 between the proximal end 35 and the distal end 39 wherein the means to facilitate movement 45 is at its middle adjustment, correspond to the aforementioned ranges one through four is as follows. Ranges one and two are thirteen and one quarter inches and for ranges three and four are eleven and one quarter inches. Note that even though the previously described different size ranges applied to standard pickup truck cargo beds, other types of containers could utilize the cargo retainer device 42 as long as the requirements of having a cargo container that has an end wall, an opposite parallel pivoted end wall defining a container length therebetween, two opposite parallel side walls defining a container width therebetween, and a floor. Thus, any general shipping container that meets these requirements could utilize the cargo retention device 42 to be mounted within for the purpose of inhibiting movement of the cargo during transit.

Turning to FIG. 3 shown is a perspective view of a third exemplary embodiment of the cargo retention device with a first extension member, a first transverse frame member, and two second extension members. The third exemplary embodiment of the cargo retention device assembly 44, a first extension member 32 having a first extension member lengthwise axis 37 including a first extension member first end 33 and a first extension member second end 31 wherein the first extension member lengthwise axis 37 extends between the first extension member first end 33 and the first extension member second end 31 is shown. The first extension member 32 also includes a means to facilitate movement 43 of the first extension member 32 along the first extension member lengthwise axis 37 to increase the distance between the first extension member first end 33 and the first and extension member second end 31 being for the ultimate purpose of engaging the first end 33 and the second end 31 with the opposing cargo container walls. This secures the first extension member between the opposing cargo container walls. It is preferred that for manufacturing simplicity and minimal cost that the means to facilitate movement 43 of the first extension member 32 be only on either the first end 33 or the second end 31 of the first extension member 32. As only a lengthwise increase in distance is required along the lengthwise axis 37 a singular means to facilitate movement 43 will accomplish the desired purpose as mentioned above. As an option, having the means to facilitate movement 43 of the length increase of the first extension member 32 the means to facilitate movement 43 could also be on both the first end 33 and on the second end 31. The means to facilitate movement 43 is accomplished in a preferred manner by the utilization of a threaded extension sleeve 36 that has an internal threaded portion that threadably engages an external thread 54 either on the first end 33 or the second end 31 of the first extension member 32. The preferred means to facilitate movement 43 is shown in more detail in FIG. 7, FIG. 8, and FIG. 9. The lengthwise increase of the first extension member 32 is accomplished by manually rotating the threaded extension sleeve 36 wherein the threaded extension sleeve 36 rotates in a manner to increase the overall length of the first extension member 32 along the lengthwise axis 37. In addition, it is preferred that the threaded extension sleeve 36 have an anti slip element 38 that is the interface contact engaging the opposing cargo container walls for the purpose of increasing the frictional resistance between the threaded extension sleeve 36 and the cargo container walls to better secure the first extension member to the opposing cargo container walls. Preferably, the anti slip element 38 is a soft resilient block that will be deformed under the use of the means to facilitate movement 43 of the first extension member 32 to increase its length along lengthwise axis 37, thereby accommodating any surface irregularities of the opposing cargo container walls and also to protect the surface finish of the opposing cargo container walls. The anti slip element 38 is constructed of a weather resistant rubber material. Alternatively, the anti slip element 38 could be constructed of nylon, leather, or a synthetic material wherein the requirement of the anti slip element 38 deforming while under the loading from the means to facilitate movement 43 along the lengthwise axis 37 of the first extension member 32 into the opposing cargo container walls is met. Note that the anti slip element 38 is also on the first end 33 or on the second end 31 in the case of the means to facilitate movement 43 being on only the first end 33 or the second end 31, wherein the anti slip element 38 is on the end opposite of the means to facilitate movement 43 end. The means to facilitate movement 43 could be accomplished by a number of alternative methods such as spring loading, a ratcheting type mechanism, or any manner of a hydraulic or pneumatic system wherein the result would be to increase the distance between the first end 33 and the second end 31 along the lengthwise axis 37 of the first extension member 32 while having an appropriate amount of axial loading force against the cargo container walls.

The third exemplary embodiment of the cargo retention device 44 also includes a plurality of second extension members 34 each having a proximal end 35 and an opposite distal end 39. The second extension members 34 each also have an axial axis 41 that extends between the proximal end 35 and the distal end 39. The second extension members 34 each also include a means to facilitate movement 45 of the second extension member 34 along the axial axis 41 to increase the distance between the proximal end 35 and the distal end 39 such that the distal end 39 engages the cargo container floor when the cargo retention device 44 is in the assembled state as shown. The means to facilitate movement 45 of each second extension member 34 is accomplished in the same manner as the means to facilitate movement 43 of the first extension member 32 as previously described. In addition, it is preferred that the threaded extension sleeve 36 have an anti slip element 38 that is the interface contact engaging the cargo floor for the purpose of increasing the frictional resistance between the threaded extension sleeve 36 and the cargo floor to better secure the second extension members 34 to the cargo container floor. Preferably, the anti slip element 38 is a soft resilient block that will be deformed under the use of the means to facilitate movement 45 of the second extension member 34 to increase its length along the axial axis 41, thereby accommodating any surface irregularities of the cargo container floor and also to protect the surface finish of the cargo container floor. The anti slip element 38 is constructed of a weather resistant rubber material. Alternatively, the anti slip element 38 could be constructed of nylon, leather, or a synthetic material wherein the requirement of the anti slip element 38 deforming while under the loading from the means to facilitate movement 45 along the axial axis 41 of the second extension member 34 into the cargo container floor is met. The orientation between the first extension member 32 and the second extension members 34 is such that each second extension member 34 is in an approximately perpendicular relationship with the first extension member 32 in that each second extension member axial axis 41 intersects the first extension member lengthwise axis 37 in an approximately perpendicular relationship. This results in the proximal ends 35 being adjacent to the first extension member 32 between the first end 33 and the second end 31. The means 40 for attaching the first extension member 32, the second extension members 34, and the first transverse frame member 46 is preferably accomplished by having an affixed connection by welding or alternatively by brazing or soldering. Other means 40 of affixing the connection are by press or shrink fitting the aforementioned multiple members together. However, any number of alternative means 40 for attaching the multiple members could be used. These means 40 include a detachable connection such as a threaded connection, a nut and bolt connection, the use of a bracket with nuts and bolts, or a slotted or dovetail arrangement between the multiple members that maintains the approximately perpendicular orientation as previously described.

The materials for construction of both the first extension member 32 and the second extension members 34 are preferably a square structural tubing material being carbon steel, however, stainless steel or aluminum would be acceptable materials also. The square structural tubing is desired to be a one and one quarter inch by a one and one quarter inch square by 16 gauge in thickness for size. Alternatively, the materials for construction of both the first extension member 32 and the second extension members 34 could be a round structural tubing material being also of carbon steel, with stainless steel or aluminum being acceptable. The round structural tubing would be one and one-quarter inches in diameter by a one eighth inch wall thickness in size. Other materials and sizes of structural materials that have similar strength characteristics of the aforementioned materials of construction would also be acceptable such as plastics or composites. FIGS. 1, 2, 3, and 4 show the use of the round structural tubing for the cargo retainer device and FIGS. 5 and 6 show the use of the square structural tubing for the cargo retainer device. In using the preferred material of the square structural tubing an additional element of a threaded extension shaft 54 would be required to allow for a threadably matable engagement with the threaded extension sleeve 36, in accomplishing both the means to facilitate movement 43 and the means to facilitate movement 45, detail of this assembly is shown in FIG. 9.

Also included is a first transverse frame member 46 having a first edge 47 and an opposing second edge 49. The first transverse frame member 46 is positioned such that it is substantially parallel to the first extension member 32 and is mounted in between the plurality of second extension members 34. The first transverse frame member 46 is between the plurality of second extension members 34 such that the first edge 47 and second edge 49 are each adjacent to a different second extension member 34 with the first edge 47 and the second edge 49 being located on each respective different second extension member 34 between the proximal end 35 and the distal end 39. The means for attaching 40 frame members between the first transverse frame member 46 and the plurality of second extension members 34 is as previously described.

In order to accommodate a number of different sized cargo containers specifically concerning pickup truck cargo beds, there are four different sizes of the cargo retention device assembly 44, however, these size accommodations would apply to all embodiments disclosed for the cargo retention device. The adjustable range in length of the first extension member 32 between the first end 33 and the second end 31, wherein the means to facilitate movement 43 operates within, has a series of four operating ranges for a series of various size standard pickup bed widths. These width ranges are a first range of sixty five inches to seventy one inches, a second range of sixty one inches to sixty seven inches, a third range of fifty six inches to sixty two inches, and a fourth range of forty nine inches to fifty five inches. In addition, the nominal midpoint length of the second extension members 34 between the proximal end 35 and the distal end 39 wherein the means to facilitate movement 45 is at its middle adjustment, correspond to the aforementioned ranges one through four is as follows. Ranges one and two are thirteen and one quarter inches and for ranges three and four are eleven and one quarter inches. Note that even though the previously described different size ranges applied to standard pickup truck cargo beds, other types of containers could utilize the cargo retainer device 44 as long as the requirements of having a cargo container that has an end wall, an opposite parallel pivoted end wall defining a container length therebetween, two opposite parallel side walls defining a container width therebetween, and a floor. Thus, any general shipping container that meets these requirements could utilize the cargo retention device 44 to be mounted within for the purpose of inhibiting movement of the cargo during transit.

Now looking to FIG. 4 shown is a perspective view of a fourth exemplary embodiment of the cargo retention device with a first extension member, a first transverse frame member, two second extension members, and two second transverse frame extension members. The fourth exemplary embodiment of the cargo retention device assembly 48, a first extension member 32 having a first extension member lengthwise axis 37 including a first extension member first end 33 and a first extension member second end 31 wherein the first extension member lengthwise axis 37 extends between the first extension member first end 33 and the first extension member second end 31 is shown. The first extension member 32 also includes a means to facilitate movement 43 of the first extension member 32 along the first extension member lengthwise axis 37 to increase the distance between the first extension member first end 33 and the first and extension member second end 31 being for the ultimate purpose of engaging the first end 33 and the second end 31 with the opposing cargo container walls. This secures the first extension member between the opposing cargo container walls. It is preferred that for manufacturing simplicity and minimal cost that the means to facilitate movement 43 of the first extension member 32 be only on either the first end 33 or the second end 31 of the first extension member 32. As only a lengthwise increase in distance is required along the lengthwise axis 37 a singular means to facilitate movement 43 will accomplish the desired purpose as mentioned above. As an option, having the means to facilitate movement 43 of the length increase of the first extension member 32 the means to facilitate movement 43 could also be on both the first end 33 and on the second end 31. The means to facilitate movement 43 is accomplished in a preferred manner by the utilization of a threaded extension sleeve 36 that has an internal threaded portion that threadably engages an external thread 54 either on the first end 33 or the second end 31 of the first extension member 32. The preferred means to facilitate movement 43 is shown in more detail in FIG. 7, FIG. 8, and FIG. 9. The lengthwise increase of the first extension member 32 is accomplished by manually rotating the threaded extension sleeve 36 wherein the threaded extension sleeve 36 rotates in a manner to increase the overall length of the first extension member 32 along the lengthwise axis 37. In addition, it is preferred that the threaded extension sleeve 36 have an anti slip element 38 that is the interface contact engaging the opposing cargo container walls for the purpose of increasing the frictional resistance between the threaded extension sleeve 36 and the cargo container walls to better secure the first extension member to the opposing cargo container walls. Preferably, the anti slip element 38 is a soft resilient block that will be deformed under the use of the means to facilitate movement 43 of the first extension member 32 to increase its length along lengthwise axis 37, thereby accommodating any surface irregularities of the opposing cargo container walls and also to protect the surface finish of the opposing cargo container walls. The anti slip element 38 is constructed of a weather resistant rubber material. Alternatively, the anti slip element 38 could be constructed of nylon, leather, or a synthetic material wherein the requirement of the anti slip element 38 deforming while under the loading from the means to facilitate movement 43 along the lengthwise axis 37 of the first extension member 32 into the opposing cargo container walls is met. Note that the anti slip element 38 is also on the first end 33 or on the second end 31 in the case of the means to facilitate movement 43 being on only the first end 33 or on the second end 31, wherein the anti slip element 38 is on the end opposite of the means to facilitate movement 43 end. The means to facilitate movement 43 could be accomplished by a number of alternative methods such as spring loading, a ratcheting type mechanism, or any manner of a hydraulic or pneumatic system wherein the result would be to increase the distance between the first end 33 and the second end 31 along the lengthwise axis 37 of the first extension member 32 while having an appropriate amount of axial loading force against the cargo container walls.

The fourth exemplary embodiment of the cargo retention device 48 also includes a plurality of second extension members 34 each having a proximal end 35 and an opposite distal end 39. The second extension members 34 each also have an axial axis 41 that extends between the proximal end 35 and the distal end 39. The second extension members 34 each also include a means to facilitate movement 45 of the second extension member 34 along the axial axis 41 to increase the distance between the proximal end 35 and the distal end 39 such that the distal end 39 engages the cargo container floor when the cargo retention device 48 is in the assembled state as shown. The means to facilitate movement 45 of each second extension member 34 is accomplished in the same manner as the means to facilitate movement 43 of the first extension member 32 as previously described. In addition, it is preferred that the threaded extension sleeve 36 have an anti slip element 38 that is the interface contact engaging the cargo floor for the purpose of increasing the frictional resistance between the threaded extension sleeve 36 and the cargo floor to better secure the second extension members 34 to the cargo container floor. Preferably, the anti slip element 38 is a soft resilient block that will be deformed under the use of the means to facilitate movement 45 of the second extension member 34 to increase its length along the axial axis 41, thereby accommodating any surface irregularities of the cargo container floor and also to protect the surface finish of the cargo container floor. The anti slip element 38 is constructed of a weather resistant rubber material. Alternatively, the anti slip element 38 could be constructed of nylon, leather, or a synthetic material wherein the requirement of the anti slip element 38 deforming while under the loading from the means to facilitate movement 45 along the axial axis 41 of the second extension member 34 into the cargo container floor is met. The orientation between the first extension member 32 and the second extension members 34 is such that each second extension member 34 is in an approximately perpendicular relationship with the first extension member 32 in that each second extension member axial axis 41 intersects the first extension member lengthwise axis 37 in an approximately perpendicular relationship. This results in the proximal ends 35 being adjacent to the first extension member 32 between the first end 33 and the second end 31. The means 40 for attaching the first extension member 32, the second extension members 34, the first transverse frame member 46, the second transverse frame members 50, and the second transverse frame extension members 51 is preferably accomplished by having an affixed connection by welding or alternatively by brazing or soldering. Other means 40 of affixing the connection are by press or shrink fitting the aforementioned multiple members together. However, any number of alternative means 40 for attaching the multiple members could be used. These means 40 include a detachable connection such as a threaded connection, a nut and bolt connection, the use of a bracket with nuts and bolts, or a slotted or dovetail arrangement between the multiple members that maintains the approximately perpendicular orientation as previously described.

The materials for construction of both the first extension member 32 and the second extension members 34 are preferably a square structural tubing material being carbon steel, however, stainless steel or aluminum would be acceptable materials also. The square structural tubing is desired to be a one and one quarter inch by a one and one quarter inch square by 16 gauge in thickness for size. Alternatively, the materials for construction of both the first extension member 32 and the second extension members 34 could be a round structural tubing material being also of carbon steel, with stainless steel or aluminum being acceptable. The round structural tubing would be one and one-quarter inches in diameter by a one eighth inch wall thickness in size. Other materials and sizes of structural materials that have similar strength characteristics of the aforementioned materials of construction would also be acceptable such as plastics or composites. FIGS. 1, 2, 3, and 4 show the use of the round structural tubing for the cargo retainer device and FIGS. 5 and 6 show the use of the square structural tubing for the cargo retainer device. In using the preferred material of the square structural tubing an additional element of a threaded extension shaft 54 would be required to allow for a threadably matable engagement with the threaded extension sleeve 36, in accomplishing both the means to facilitate movement 43 and the means to facilitate movement 45, detail of this assembly is shown in FIG. 9.

Also included is a first transverse frame member 46 having a first edge 47 and an opposing second edge 49. The first transverse frame member 46 is positioned such that it is substantially parallel to the first extension member 32 and is mounted in between the plurality of second extension members 34. The first transverse frame member 46 is between the plurality of second extension members 34 such that the first edge 47 and second edge 49 are each adjacent to a different second extension member 34 with the first edge 47 and the second edge 49 being located on each respective different second extension member 34 between the proximal end 35 and the distal end 39. The means for attaching 40 frame members between the first transverse frame member 46 and the plurality of second extension members 34 is as previously described. In addition, a plurality of second transverse frame members 50 are included that each have a first termination point 53 and an opposing second termination point 55. The plurality of second transverse frame members 50 are positioned to be substantially parallel to the second extension members 34 and are mounted in between the first extension member 32 and the first transverse frame member 46. The second transverse frame members 50 are mounted such that the first termination point 53 is adjacent to the first extension member 32 and that the second termination point 55 is adjacent to the first transverse frame member 46. These adjacent points which comprise the means 40 for attaching the second transverse frame member 50 to both the first extension member 32 and the first transverse frame member 46 are as previously described. Optionally, a plurality of second transverse frame extension members 51 can be included as shown. Each second transverse frame extension member 51 includes a first tip 57 and an opposing second tip 59. The second transverse frame extension member 51 is positioned to be approximately parallel to the second extension members 34 with the first tip 57 being adjacent to the first transverse frame member 46 and with the second tip 59 being cantilevered, in other words unsupported in free space. These adjacent points which comprise the means 40 for attaching the second transverse frame extension member 51 to the first transverse frame member 46 are as previously described.

In order to accommodate a number of different sized cargo containers specifically concerning pickup truck cargo beds, there are four different sizes of the cargo retention device assembly 48, however, these size accommodations would apply to all embodiments disclosed for the cargo retention device. The adjustable range in length of the first extension member 32 between the first end 33 and the second end 31, wherein the means to facilitate movement 43 operates within, has a series of four operating ranges for a series of various size standard pickup bed widths. These width ranges are a first range of sixty five inches to seventy one inches, a second range of sixty one inches to sixty seven inches, a third range of fifty six inches to sixty two inches, and a fourth range of forty nine inches to fifty five inches. In addition, the nominal midpoint length of the second extension members 34 between the proximal end 35 and the distal end 39 wherein the means to facilitate movement 45 is at its middle adjustment, correspond to the aforementioned ranges one through four is as follows. Ranges one and two are thirteen and one quarter inches and for ranges three and four are eleven and one quarter inches. Note that even though the previously described different size ranges applied to standard pickup truck cargo beds, other types of containers could utilize the cargo retainer device 48 as long as the requirements of having a cargo container that has an end wall, an opposite parallel pivoted end wall defining a container length therebetween, two opposite parallel side walls defining a container width therebetween, and a floor. Thus, any general shipping container that meets these requirements could utilize the cargo retention device 48 to be mounted within for the purpose of inhibiting movement of the cargo during transit.

Further on to FIG. 5 shown is a perspective view of a fifth exemplary embodiment of the cargo retention device with a first extension square tubing member, a first transverse square tubing member, two second extension square tubing members, and two second transverse square tubing members. The fifth exemplary embodiment of the cargo retention device assembly 52, a first extension member 32 having a first extension member lengthwise axis 37 including a first extension member first end 33 and a first extension member second end 31 wherein the first extension member lengthwise axis 37 extends between the first extension member first end 33 and the first extension member second end 31 is shown. The first extension member 32 also includes a means to facilitate movement 43 of the first extension member 32 along the first extension member lengthwise axis 37 to increase the distance between the first extension member first end 33 and the first and extension member second end 31 being for the ultimate purpose of engaging the first end 33 and the second end 31 with the opposing cargo container walls. This secures the first extension member between the opposing cargo container walls. It is preferred that for manufacturing simplicity and minimal cost that the means to facilitate movement 43 of the first extension member 32 be only on either the first end 33 or the second end 31 of the first extension member 32. As only a lengthwise increase in distance is required along the lengthwise axis 37 a singular means to facilitate movement 43 will accomplish the desired purpose as mentioned above. As an option, having the means to facilitate movement 43 of the length increase of the first extension member 32 the means to facilitate movement 43 could also be on both the first end 33 and on the second end 31 as is shown. The means to facilitate movement 43 is accomplished in a preferred manner by the utilization of a threaded extension sleeve 36 that has an internal threaded portion that threadably engages an external thread 54 either on the first end 33 or the second end 31 of the first extension member 32. The preferred means to facilitate movement 43 is shown in more detail in FIG. 7, FIG. 8, and FIG. 9. The lengthwise increase of the first extension member 32 is accomplished by manually rotating the threaded extension sleeve 36 wherein the threaded extension sleeve 36 rotates in a manner to increase the overall length of the first extension member 32 along the lengthwise axis 37. In addition, it is preferred that the threaded extension sleeve 36 have an anti slip element 38 that is the interface contact engaging the opposing cargo container walls for the purpose of increasing the frictional resistance between the threaded extension sleeve 36 and the cargo container walls to better secure the first extension member to the opposing cargo container walls. Preferably, the anti slip element 38 is a soft resilient block that will be deformed under the use of the means to facilitate movement 43 of the first extension member 32 to increase its length along lengthwise axis 37, thereby accommodating any surface irregularities of the opposing cargo container walls and also to protect the surface finish of the opposing cargo container walls. The anti slip element 38 is constructed of a weather resistant rubber material. Alternatively, the anti slip element 38 could be constructed of nylon, leather, or a synthetic material wherein the requirement of the anti slip element 38 deforming while under the loading from the means to facilitate movement 43 along the lengthwise axis 37 of the first extension member 32 into the opposing cargo container walls is met. Note that the anti slip element 38 is also on the first end 33 or on the second end 31 in the case of the means to facilitate movement 43 being on only the first end 33 or on the second end 31, wherein the anti slip element 38 is on the end opposite of the means to facilitate movement 43 end. The means to facilitate movement 43 could be accomplished by a number of alternative methods such as spring loading, a ratcheting type mechanism, or any manner of a hydraulic or pneumatic system wherein the result would be to increase the distance between the first end 33 and the second end 31 along the lengthwise axis 37 of the first extension member 32 while having an appropriate amount of axial loading force against the cargo container walls.

The fifth exemplary embodiment of the cargo retention device 52 also includes a plurality of second extension members 34 each having a proximal end 35 and an opposite distal end 39. The second extension members 34 each also have an axial axis 41 that extends between the proximal end 35 and the distal end 39. The second extension members 34 each also include a means to facilitate movement 45 of the second extension member 34 along the axial axis 41 to increase the distance between the proximal end 35 and the distal end 39 such that the distal end 39 engages the cargo container floor when the cargo retention device 52 is in the assembled state as shown. The means to facilitate movement 45 of each second extension member 34 is accomplished in the same manner as the means to facilitate movement 43 of the first extension member 32 as previously described. In addition, it is preferred that the threaded extension sleeve 36 have an anti slip element 38 that is the interface contact engaging the cargo floor for the purpose of increasing the frictional resistance between the threaded extension sleeve 36 and the cargo floor to better secure the second extension members 34 to the cargo container floor. Preferably, the anti slip element 38 is a soft resilient block that will be deformed under the use of the means to facilitate movement 45 of the second extension member 34 to increase its length along the axial axis 41, thereby accommodating any surface irregularities of the cargo container floor and also to protect the surface finish of the cargo container floor. The anti slip element 38 is constructed of a weather resistant rubber material. Alternatively, the anti slip element 38 could be constructed of nylon, leather, or a synthetic material wherein the requirement of the anti slip element 38 deforming while under the loading from the means to facilitate movement 45 along the axial axis 41 of the second extension member 34 into the cargo container floor is met. The orientation between the first extension member 32 and the second extension members 34 is such that each second extension member 34 is in an approximately perpendicular relationship with the first extension member 32 in that each second extension member axial axis 41 intersects the first extension member lengthwise axis 37 in an approximately perpendicular relationship. This results in the proximal ends 35 being adjacent to the first extension member 32 between the first end 33 and the second end 31. The means 40 for attaching the first extension member 32, the second extension members 34, the first transverse frame member 46, and the second transverse frame members 50, is preferably accomplished by having an affixed connection by welding or alternatively by brazing or soldering. Other means 40 of affixing the connection are by press or shrink fitting the aforementioned multiple members together. However, any number of alternative means 40 for attaching the multiple members could be used. These means 40 include a detachable connection such as a threaded connection, a nut and bolt connection, the use of a bracket with nuts and bolts, or a slotted or dovetail arrangement between the multiple members that maintains the approximately perpendicular orientation as previously described.

The materials for construction of both the first extension member 32 and the second extension members 34 are preferably a square structural tubing material as shown, the square structural tubing being carbon steel, however, stainless steel or aluminum would be acceptable materials also. The square structural tubing is desired to be a one and one quarter inch by a one and one quarter inch square by 16 gauge in thickness for size. Alternatively, the materials for construction of both the first extension member 32 and the second extension members 34 could be a round structural tubing material being also of carbon steel, with stainless steel or aluminum being acceptable. The round structural tubing would be one and one-quarter inches in diameter by a one eighth inch wall thickness in size. Other materials and sizes of structural materials that have similar strength characteristics of the aforementioned materials of construction would also be acceptable such as plastics or composites. FIGS. 1, 2, 3, and 4 show the use of the round structural tubing for the cargo retainer device and FIGS. 5 and 6 show the use of the square structural tubing for the cargo retainer device. In using the preferred material of the square structural tubing an additional element of a threaded extension shaft 54 would be required to allow for a threadably matable engagement with the threaded extension sleeve 36, in accomplishing both the means to facilitate movement 43 and the means to facilitate movement 45, detail of this assembly is shown in FIG. 9.

Also included is a first transverse frame member 46 having a first edge 47 and an opposing second edge 49. The first transverse frame member 46 is positioned such that it is substantially parallel to the first extension member 32 and is mounted in between the plurality of second extension members 34. The first transverse frame member 46 is between the plurality of second extension members 34 such that the first edge 47 and second edge 49 are each adjacent to a different second extension member 34 with the first edge 47 and the second edge 49 being located on each respective different second extension member 34 between the proximal end 35 and the distal end 39. The means for attaching 40 frame members between the first transverse frame member 46 and the plurality of second extension members 34 is as previously described. In addition, a plurality of second transverse frame members 50 are included that each have a first termination point 53 and an opposing second termination point 55. The plurality of second transverse frame members 50 are positioned to be substantially parallel to the second extension members 34 and are mounted in between the first extension member 32 and the first transverse frame member 46. The second transverse frame members 50 are mounted such that the first termination point 53 is adjacent to the first extension member 32 and that the second termination point 55 is adjacent to the first transverse frame member 46. These adjacent points which comprise the means 40 for attaching the second transverse frame member 50 to both the first extension member 32 and the first transverse frame member 46 are as previously described.

In order to accommodate a number of different sized cargo containers specifically concerning pickup truck cargo beds, there are four different sizes of the cargo retention device assembly 52, however, these size accommodations would apply to all embodiments disclosed for the cargo retention device. The adjustable range in length of the first extension member 32 between the first end 33 and the second end 31, wherein the means to facilitate movement 43 operates within, has a series of four operating ranges for a series of various size standard pickup bed widths. These width ranges are a first range of sixty five inches to seventy one inches, a second range of sixty one inches to sixty seven inches, a third range of fifty six inches to sixty two inches, and a fourth range of forty nine inches to fifty five inches. In addition, the nominal midpoint length of the second extension members 34 between the proximal end 35 and the distal end 39 wherein the means to facilitate movement 45 is at its middle adjustment, correspond to the aforementioned ranges one through four is as follows. Ranges one and two are thirteen and one quarter inches and for ranges three and four are eleven and one quarter inches. Note that even though the previously described different size ranges applied to standard pickup truck cargo beds, other types of containers could utilize the cargo retainer device 52 as long as the requirements of having a cargo container that has an end wall, an opposite parallel pivoted end wall defining a container length therebetween, two opposite parallel side walls defining a container width therebetween, and a floor. Thus, any general shipping container that meets these requirements could utilize the cargo retention device 52 to be mounted within for the purpose of inhibiting movement of the cargo during transit.

Now turning to FIG. 6 is a perspective view of a sixth exemplary embodiment of the cargo retention device with a first extension square tubing member, a first transverse square tubing member, two second extension square tubing members, two second transverse square tubing members, and two second transverse square tubing extension members. The sixth exemplary embodiment of the cargo retention device 66 is identical to the fifth exemplary embodiment 52 as shown in FIG. 5 with the exception of having the added second transverse frame extension members 51 described as follows. A plurality of second transverse frame extension members 51 can be included as shown. Each second transverse frame extension member 51 includes a first tip 57 and an opposing second tip 59. The second transverse frame extension member 51 is positioned to be approximately parallel to the second extension members 34 with the first tip 57 being adjacent to the first transverse frame member 46 and with the second tip 59 being cantilevered, in other words unsupported in free space. The means 40 for attaching the first extension member 32, the second extension members 34, the first transverse frame member 46, the second transverse frame members 50, and the second transverse frame extension members 51 is preferably accomplished by having an affixed connection by welding or alternatively by brazing or soldering. Other means 40 of affixing the connection are by press or shrink fitting the aforementioned multiple members together. However, any number of alternative means 40 for attaching the multiple members could be used. These means 40 include a detachable connection such as a threaded connection, a nut and bolt connection, the use of a bracket with nuts and bolts, or a slotted or dovetail arrangement between the multiple members that maintains the approximately perpendicular orientation as previously described.

Moving towards FIG. 7 shown is a perspective view of the screw extension mechanism disassembled for clarity. Starting with the threaded extension shaft 54 which is preferably constructed from a one and one-quarter inch diameter carbon steel tubing with a one eighth inch thick wall section. Alternatively, the threaded extension shaft 54 could be constructed of stainless steel or aluminum. The external threads 72 are preferably a 1 and ¼ inch by 5 threads per inch Acme thread type. However, other types of threads such as standard coarse threads or standard fine threads would be acceptable as long as the purpose as stated in the means to facilitate movement 43 and means to facilitate movement 45 in previous FIGS. 1 through 6 were accomplished. The threaded extension sleeve 36 is preferably constructed of aluminum, however, could be constructed of either carbon steel or stainless steel. The threaded extension sleeve 36 has internal threads 70 that are matingly engaged with the external threads 72 such that when the threaded extension sleeve 36 is rotated such that the anti slip element 38 that is attached to the threaded extension sleeve 36 moves in an axial manner to accomplish the desired purpose as stated in the means to facilitate movement 43 and the means to facilitate movement 45 as previously described.

Moving next to FIG. 8 shown is a perspective view of the screw extension mechanism that is assembled and shown in use with a lock that prevents the screw extension mechanism from retracting in length. Beginning with the lockable element 74, which is preferably a conventional padlock type as shown, the lockable element is inserted and through a plurality of holes 76 that are in the threaded extension shaft 54. However, any manner of locking the means to facilitate movement 43 of the first extension member 32 to secure the selected length or distance between the first end 33 and the second end 31 of the first extension member 32 as described in FIGS. 1 through 6 would be acceptable. When the lockable element 74 is locked it will be in a locked state which will allow the aforementioned selectable distance between the first end 33 and the second end 31 to not be reduced which ultimately will lockably secure all the disclosed embodiments of the cargo retainer device to the cargo container, thus preventing against unauthorized removal of the cargo retainer device from the cargo container. Following this, when the lockable element 74 is in an unlocked state the aforementioned selectable distance between the first end 33 and the second end 31 would be able to be reduced allowing removal of the cargo retainer device from a cargo container. As shown, the threaded extension sleeve 36 utilizes the anti slip element 38 as previously described. The lockable element 74 utilizes a plurality of holes 76 there are preferably nine thirty seconds of an inch in diameter that are drilled through both walls of the threaded extension shafts 54 along a common axis. The plurality of holes 76 are also preferably spaced such that to allow a maximum range of adjustability of the threaded extension sleeve 36 in relation to the threaded extension shaft 54 to provide for locking of the means to facilitate movement 43 the first extension member as previously described. The plurality of holes 76 can be added to both the external threads 72 and to the non-threaded portion of the threaded extension shaft 54 to maximize the adjustability for applying the lockable element 74 to secure the rotational relationship between the threaded extension sleeve 36 and the threaded extension shaft 54. Alternative lockable elements 74 could include a form of a clamping lock that would fit around the periphery or circumference of the threaded extension sleeve 36 and the threaded extension shaft 54 to secure and lock the rotational relationship between the threaded extension sleeve 36 and the threaded extension shaft 54, thus maintaining the selected length of the first extension member as desired.

Looking on to FIG. 9 shown is a perspective view of the screw extension mechanism disassembled for clarity as applied to the embodiments shown in FIGS. 5 and 6, being specifically for the use of the square tubing members with both the means to facilitate movement 43 and 45 as previously described in FIGS. 1 through 6. Starting with the both the first extension member 32 and the second extension member 34 which are shown as square tubing members wherein there is required a separate element to create the threaded extension shaft 54 to accomplish the previously described means to facilitate movement 43 and 45 to increase the length along the length between the first end 33 and second end 31 along lengthwise axis 37 of the first extension member 32. Also, to increase the length between the proximal end 35 and the distal end 39 along the axial axis 41 of the second extension member 34 all as previously described in FIGS. 1 through 6. Note that when the cargo retainer assembly is constructed of round tubing stock as shown in FIGS. 1 through 4 a separate threaded extension shaft is not required as the round tubing stock can be directly threaded making the threaded end and the first extension member 32 and the second extension member 34 a homogenous piece of material. The threaded extension shaft 54 is attached to either the first extension member 32 or the second extension member 34 by a means 56. The means 56 for attaching the threaded extension shaft 54 to the first extension member 32 or to the second extension member 34 is preferably accomplished by affixing the extension shaft 54 to the first extension member 32 or to the second extension member 34 as shown by welding in a complete peripheral circumference around the threaded extension shaft 54 interface with either the distal end 39 of the second extension member 34 or the first end 33 and/or the second end 31 of the first extension member 32. Alternatively, if the welding could be replaced by brazing or soldering in the same manner. Optionally, means 56 could be accomplished by a detachable connection by threading the extension shaft 54 into either the first extension member 32 or second extension member 34 or could be accomplished by a shrink or press fit of the extension shaft 54 into the first extension member 32 or the second extension member 34, other methods for accomplishing means 56 could be by pinning, or using an adhesive. As previously described in FIG. 7 the threaded extension sleeve 36 having an anti slip element 38 is shown along with the internal thread 70 that matably engages with the external threads 72 of the threaded extension shaft 54.

Further turning to FIG. 10 shown is an end view of a cargo divider assembly that can be attached to the structure of the cargo retention device to further secure the cargo while in transit. Beginning with the cargo divider assembly in 78, which includes a cargo divider frame 82, a securing thumbscrew 84, a base 86 for the securing thumbscrew 84, and a cargo divider assembly extension 80. The cargo divider assembly 78 is adapted to engage the first extension member 32 such that the cargo divider assembly extension 80 is oriented approximately perpendicular to the first extension member 32 lengthwise axis 37. The cargo divider assembly 78 and in particular the extension 80 act to retain cargo in an axis parallel to the first extension member 32 lengthwise axis 37, with the purpose being to further secure the cargo in the cargo container in conjunction with all embodiments of the cargo retainer device as disclosed. The length of the extension 80 can be variable to accommodate different shapes and configurations of the cargo that is placed in the cargo container for transit. The cargo divider frame 82 is preferably constructed from one and one-quarter inch by two inch by one quarter inch thick angle iron structural stock beam material in combination with a one and one-quarter inch by one quarter inch thick carbon steel plate section wherein the angle iron beam and the carbon steel plate form an inverted U-shaped structure as shown. The attachment of the angle iron beam and the steel plate is preferably completed by welding or alternatively brazing or soldering. The materials of construction for the frame 82 are also preferably structural carbon steel, however, stainless steel, aluminum, plastics, or composites would be acceptable assuming that these alternative materials meet the required strength requirements. The thumbscrew is preferably a number 18-8 stainless steel elevator type bolt having a size of five sixteenths inch in diameter by eighteen threads per inch and being one and one-half inches in length. The thumbscrew 84 is threadably engaged with a leg of the frame 82 as shown. There is also a base 86 that loads onto the frame member from the thumbscrew 84 acting to distribute the compressive load over a wider surface area to allow for a more secure mounting of the cargo divider assembly 78 onto the frame member. The extension 80 as previously stated can be any desired length to accommodate the size and configuration of the cargo was required. The extension 80 is attached to the frame 82 preferably by welding or alternatively a soldering or brazing. The materials of construction of extension 80 are the same as a frame 82 being structural carbon steel or alternatively stainless steel or aluminum as long as the operational requirements are met.

As FIG. 10 indicates the cargo divider assembly 78 is adapted to engage not only the first extension member 32 as previously mentioned but also the second extension member 34, the first transverse frame member 46, and the second transverse frame member 50 to provide for the maximum flexibility in securing cargo in the cargo container. Although not shown, the cargo divider assembly could be adapted to engage the round tubing stock option for constructing the framework of all the different embodiments of the cargo retainer device. In either the case of using round tubing stock or square tubing stock for the cargo retainer fame the primary purpose of the cargo divider assembly 78 is to support the cargo in an axis that is parallel to the frame member axis that the cargo divider assembly 78 is engaged with, as that particular frame member already supports the cargo in an axis perpendicular to the frame member wherein the cargo divider assembly 78 supports cargo in an axis parallel to the frame member that the cargo divider assembly 78 is engaged with.

Method of Use

FIGS. 11 through 20 depict the alternative methods of use of all the embodiments of the cargo retainer device as shown in the pickup bed of a conventional light duty truck. Although FIGS. 11 through 20 show the pickup bed of a conventional light duty truck 88, any number of cargo containers such as containerized cargo containers that fit on ships and trucks, trailers with cargo containers, and the like would be acceptable to work with the cargo retainer device as long as the cargo container meets the general following requirements. The cargo container would generally need to have an end wall 90, an opposite parallel pivoted end wall 91 defining a container length therebetween, two opposite parallel side walls 94 defining a container width therebetween, and a floor 96. FIGS. 11, 12, 13, 14, 15, and 16 show a piece of cargo 92 that is of the flat or lower rise configuration, wherein the cargo 92 is of a size or occupies a volume that is less than the volume of the cargo container itself. This is required for the cargo retainer device to inhibit movement of the cargo during transit thus allowing the cargo retainer device to fulfill its desired purpose given the following methods of use.

Figure 11:
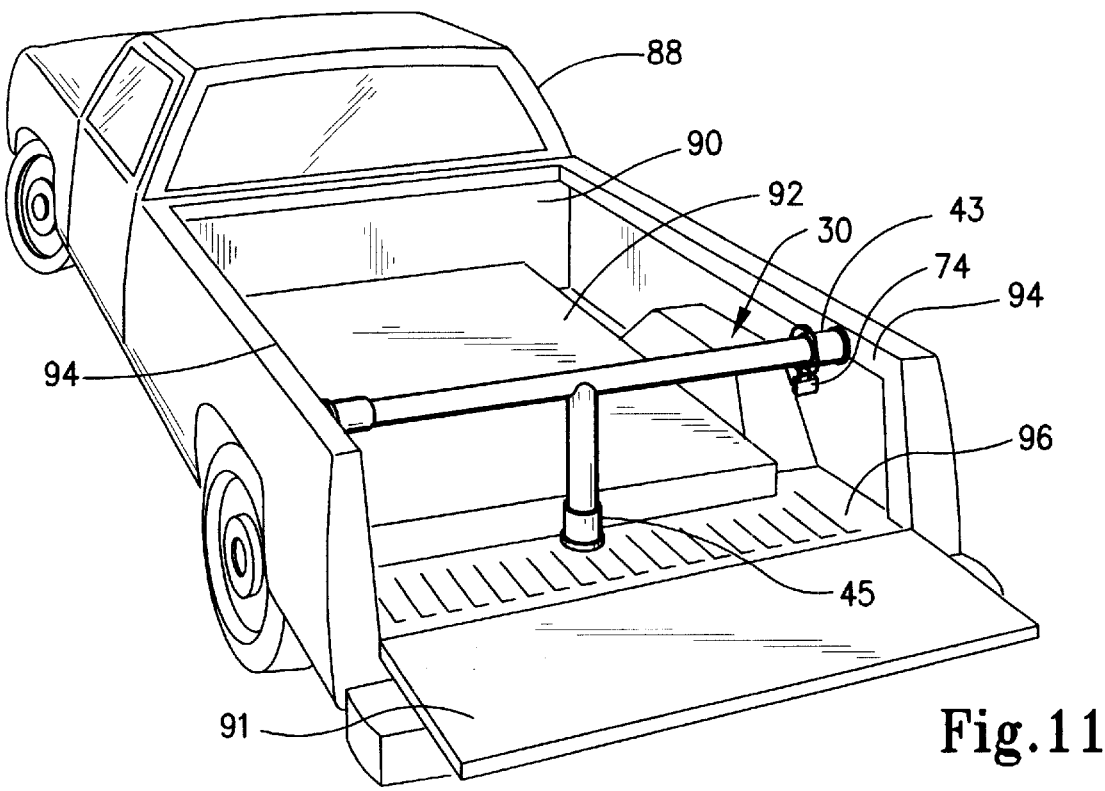
FIG. 11 is a perspective view of the first exemplary embodiment of the cargo retention device in use being mounted in a pickup truck bed.

Starting with FIG. 11 is a perspective view of the first exemplary embodiment of the cargo retention device in use being mounted in a pickup truck bed. The first step is to provide the cargo retainer device as shown in FIG. 11 as the first embodiment being the retainer device assembly 30, the cargo retainer device generally includes a first extension member with a means to facilitate movement 43 for a length extension of the first extension member and a second extension member with a means to facilitate movement 45 for a length extension of the second extension member. The orientation of the first extension member and the second extension member is such that the second extension member is attached to the first extension member and extends approximately perpendicularly therefrom. The next step is to place cargo 92 into the cargo container taking care to place the cargo 92 such that the cargo is adjacent to the wall of the container, thereby utilizing the container wall or walls to brace the cargo within the container. Following this a further step that would be to position the cargo retainer device 30 within the cargo container such that the cargo retainer device 30 is interposed between the cargo 92 placed in the container for shipment and a wall of the container that is not adjacent to the cargo 92. Thus, the purpose to add an adjacent restraint against the cargo that does not currently exist which in turn inhibits the movement of the cargo during transit. Further, a following step is to mount the cargo retainer device 30 within the cargo container by manually urging the means 43 to increase the length extension of the first extension member between the parallel sidewalls 94 such that the first extension member is approximately perpendicular to the parallel sidewalls. The result of this is to have the first extension member expand in length to contact the parallel sidewalls 94 thus securing the first extension member in its desired position. Finally, a step to manually engage the second extension member through the means to facilitate movement 45 for a length extension of the second extension member to engage the cargo container floor 96. The purpose of this is to provide a solid support perpendicular to the floor of the cargo container in allowing the cargo retainer device 30 to support a cargo load off of or above the cargo container floor 96.

Figure 12:
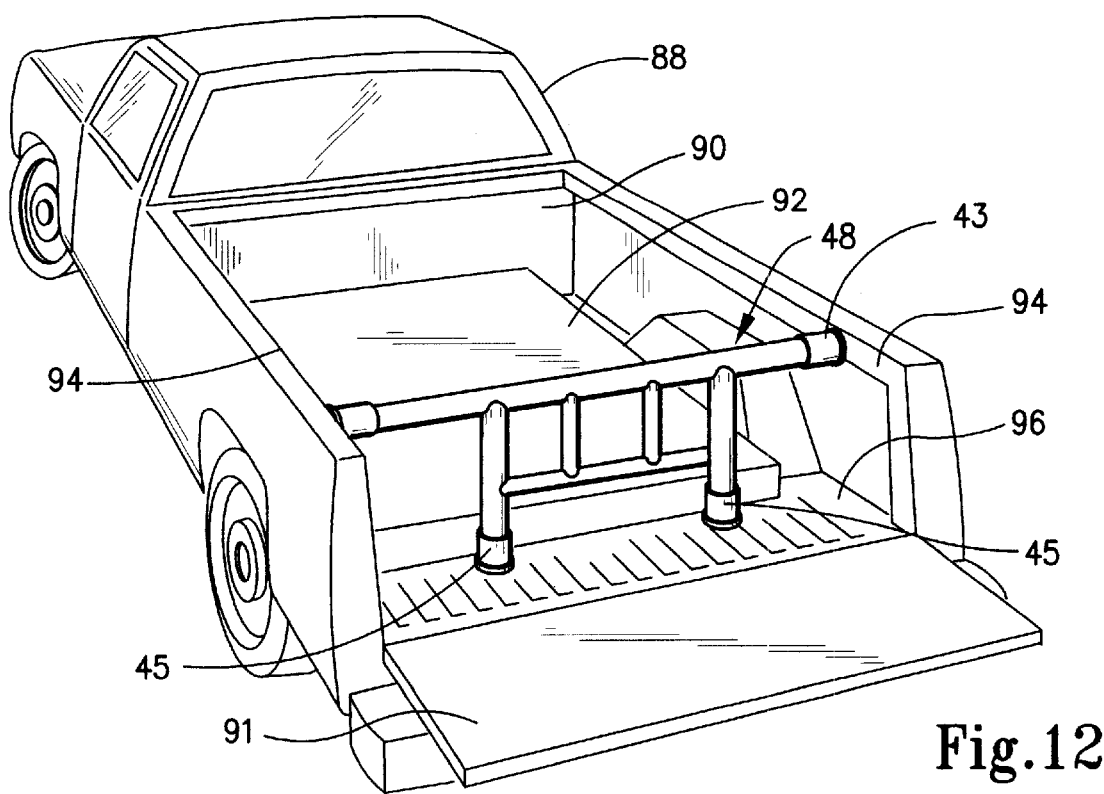
FIG. 12 is a perspective view of the fourth exemplary embodiment of the cargo retention device in use being mounted in a pickup truck bed.
Figure 13:
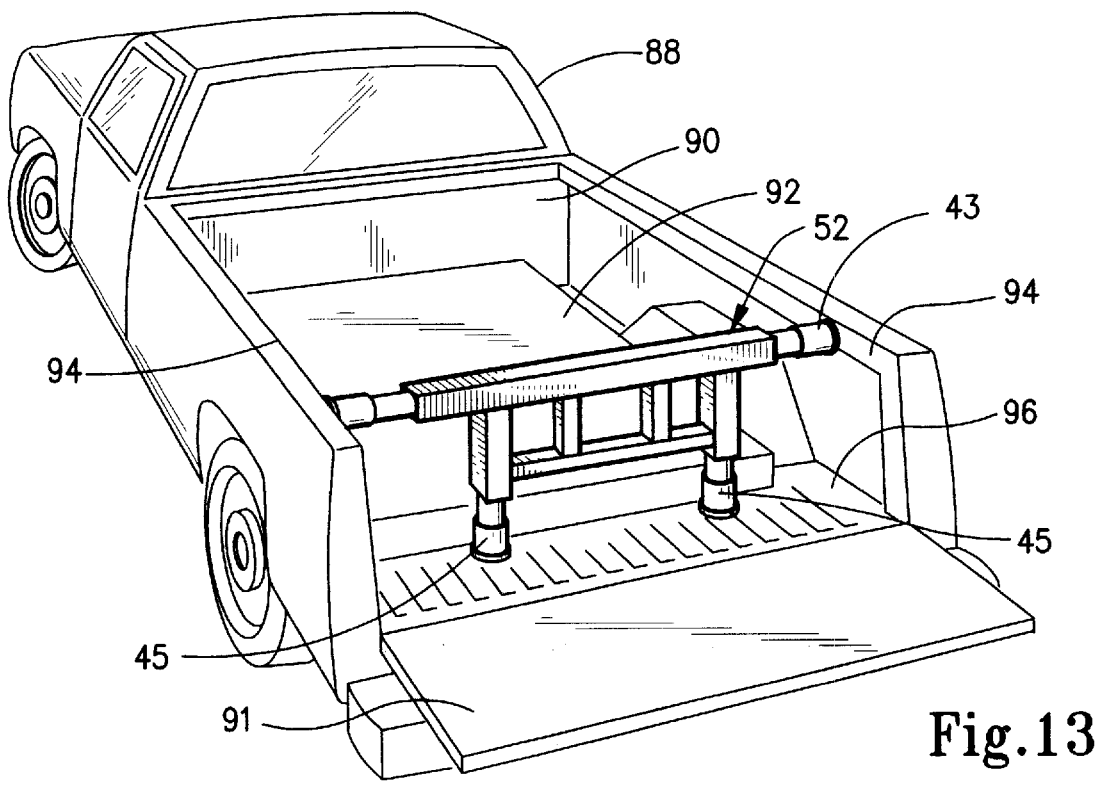
FIG. 13 is a perspective view of the fifth exemplary embodiment of the cargo retention device in use being mounted in a pickup truck bed.
Figure 14:
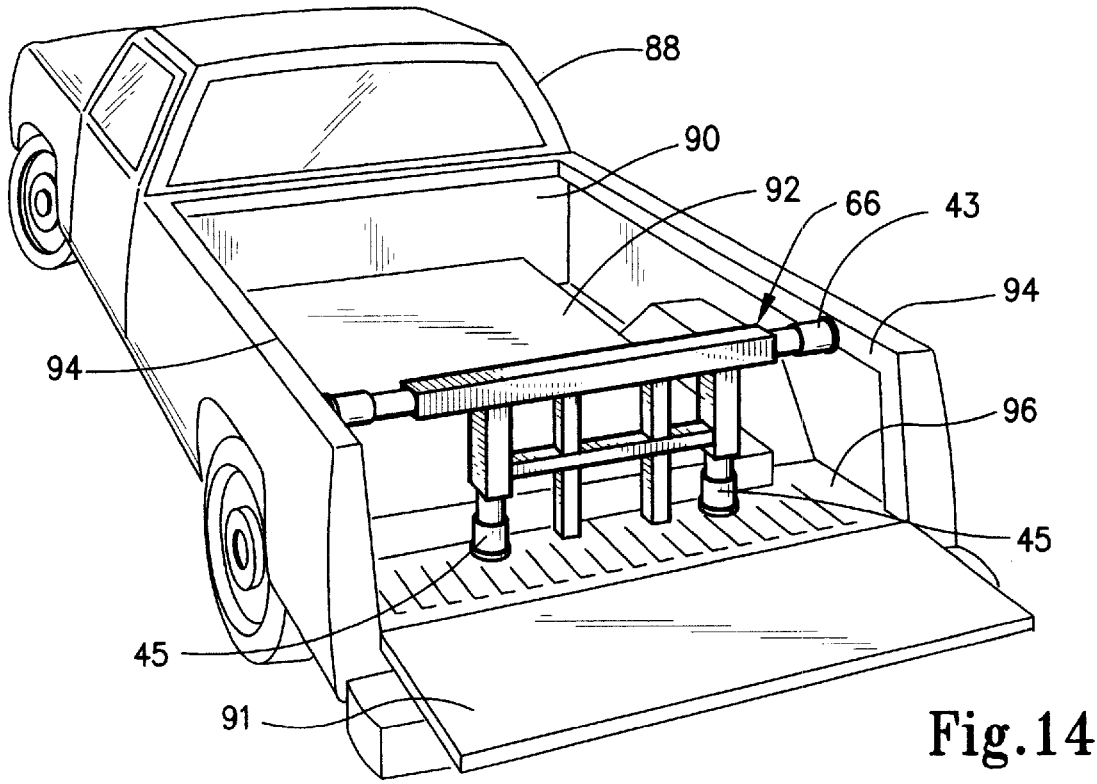
FIG. 14 is a perspective view of the sixth exemplary embodiment of the cargo retention device in use being mounted in a pickup truck bed.

Further a step could be added to include a lockable element that would engage the means to facilitate movement 43 of the first extension member to maintain a selected length in contacting the parallel sidewalls 94 of the container. The lockable element 74 is adapted to engage the means to facilitate movement 43 and once placed a locked state, the lockable element 74 is such that there can be no reduction in length of the first extension member thus not allowing the first extension member to disengage from the parallel sidewalls 94 of the container, resulting in a secure protection against the cargo retainer device having an unauthorized removal from the cargo container. When the lockable element 74 is placed in an unlocked state, the first extension member can have its length reduced and manually reversing the means to facilitate movement 43 that results in allowing the first extension member to disengage from the parallel sidewalls 94 of the container. The lockable element 74 is detailed in FIG. 8 in its relationship to the means to facilitate movement 43 for a length extension of the first extension member. Note that the lockable element 74 could be used with any of the embodiments of the cargo retainer device being adapted to engage the means to facilitate movement 43 for increasing the length of the first extension member to secure the cargo retainer device from having an unauthorized removal from the cargo container. Moving to FIG. 12 shown is a perspective view of the fourth exemplary embodiment of the cargo retention device in use being mounted in a pickup truck bed. The fourth exemplary embodiment of the cargo retention device 48 is installed and used in a like manner to the use description given in FIG. 11 for the first exemplary embodiment of the cargo retention device 30 with the addition of an additional means to facilitate movement 45 for the additional second extension member to contact the cargo container floor. Next looking to FIG. 13 shown is a perspective view of the fifth exemplary embodiment of the cargo retention device in use being mounted in a pickup truck bed. The fifth exemplary embodiment 52 is similar to the fourth exemplary embodiment cargo retention device 48 for installation and use, wherein the fifth exemplary embodiment of the cargo retention device 52 shows construction from square structural tubing in FIG. 13 as opposed to the fourth exemplary embodiment of the cargo retention device 48 constructed of round stock tubing in FIG. 12. Looking on to FIG. 14 is a perspective view of the sixth exemplary embodiment of the cargo retention device in use being mounted in a pickup truck bed. The sixth exemplary embodiment of the cargo retention device 66 has the addition of a plurality of second transverse frame extension members as detailed in FIG. 6, in relation to the fifth exemplary embodiment of the cargo retention device 52 in FIG. 13. Thus, the sixth exemplary embodiment of the cargo retention device 66 is installed and used in a like manner to the fifth embodiment of the cargo retainer device 52.

Figure 15:
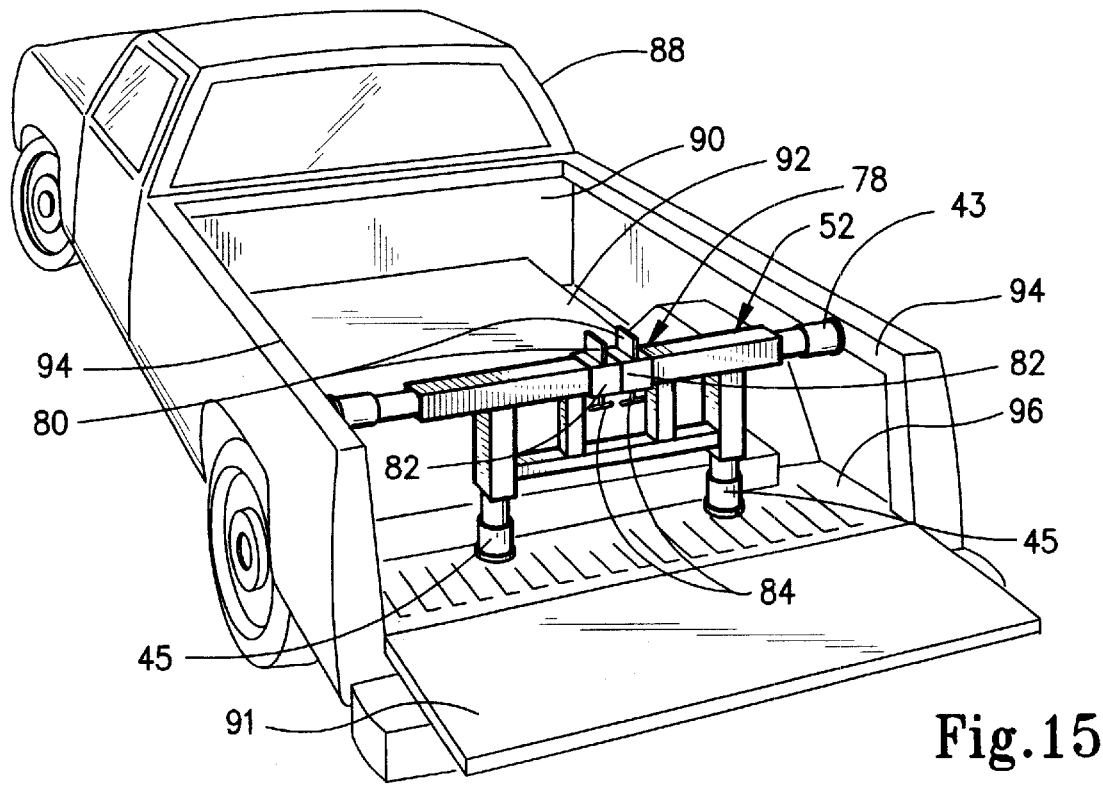
FIG. 15 is a perspective view of the fifth exemplary embodiment of the cargo retention device in use being mounted in a pickup truck bed with two cargo divider assemblies shown mounted to the frame structure.

Further to FIG. 15 shown is a perspective view of the fifth exemplary embodiment of the cargo retention device in use being mounted in a pickup truck bed with the addition of two cargo divider assemblies shown mounted to the frame structure. The cargo divider assemblies 78 are shown as being added to the fifth embodiment of the cargo retainer device 52 as depicted in FIG. 13. The cargo divider assemblies 78 are added as shown to be engaged to the first extension member as an additional step such that the cargo divider assemblies 78 have extensions that are approximately perpendicular to the first extension member lengthwise axis. The purpose of the cargo divider assemblies 78 are that they act to retain cargo in an axis parallel to the first extension member lengthwise axis. The cargo that would be supported by the cargo divider assemblies 78 in conjunction with the cargo divider assembly extensions 80, which are shown in detail in FIG. 10. The cargo divider assembly extensions 78 are each engaged to the first extension member by positioning the cargo divider frame 82 onto the first extension member and then tightening the thumbscrew 84 to secure the cargo divider assembly 78 to the first extension member. Note that the cargo divider assemblies 78 could also be mounted on the other structural frame members of the cargo retention device as described in FIG. 10 to further secure the cargo in the cargo container.

Figure 16:
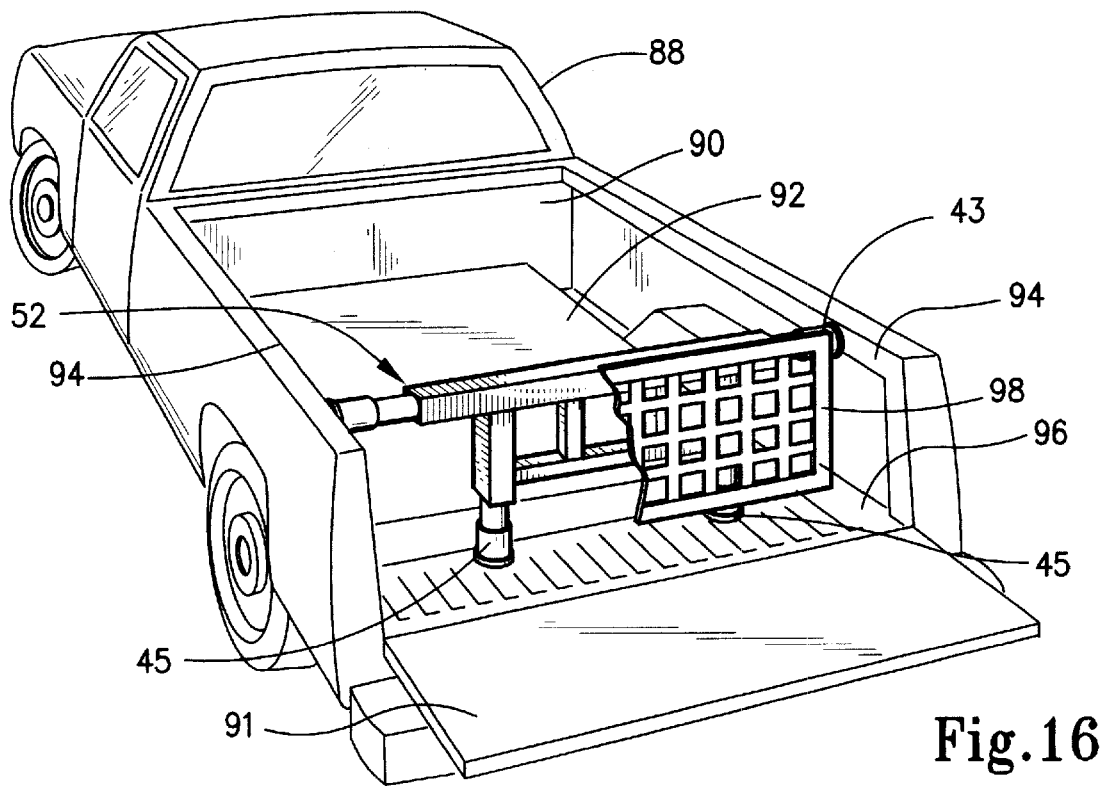
FIG. 16 is a perspective view of the fifth exemplary embodiment of the cargo retention device in use being mounted in a pickup truck bed with a net shown mounted to the frame structure.

Moving to FIG. 16 shown is a perspective view of the fifth exemplary embodiment of the cargo retention device in use being mounted in a pickup truck bed with a net shown mounted to the frame structure. An added further step in securing the cargo 92 to the cargo container is shown by the attaching of a cargo net 98 that is adapted to attach to the first extension member and to the second extension member of the cargo retainer device 52. The result is that the cargo net 98 is positioned to act as a retention barrier in-between the opposing cargo container walls 94. The method of attaching the cargo net 98 to the cargo retention device is preferably accomplished by using a plurality of conventional loops that are fixedly attached to the first extension member and the second extension member. Other methods of attaching the cargo net 98 would also be acceptable such as ties, snaps, and the like as long as the cargo net 98 is attached to the cargo retention device with sufficient strength to retain or inhibit the cargo from exiting the cargo container during transit. Note that the cargo net 98 is shown with the fifth exemplary embodiment of the cargo retention device 52, however, the cargo net 98 can be used with any of the embodiments disclosed of the cargo retention device.

Figure 17:
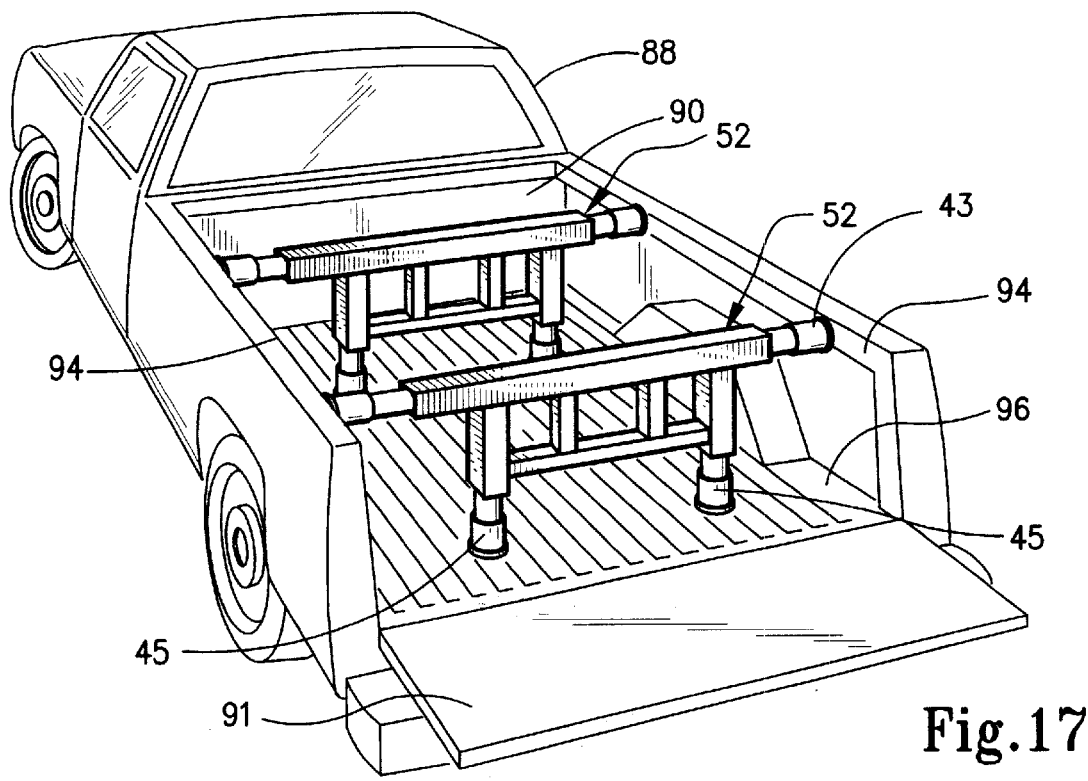
FIG. 17 is a perspective view of the fifth exemplary embodiment of the cargo retention device in use being mounted in a pickup truck bed with two cargo retention devices.
Figure 18:
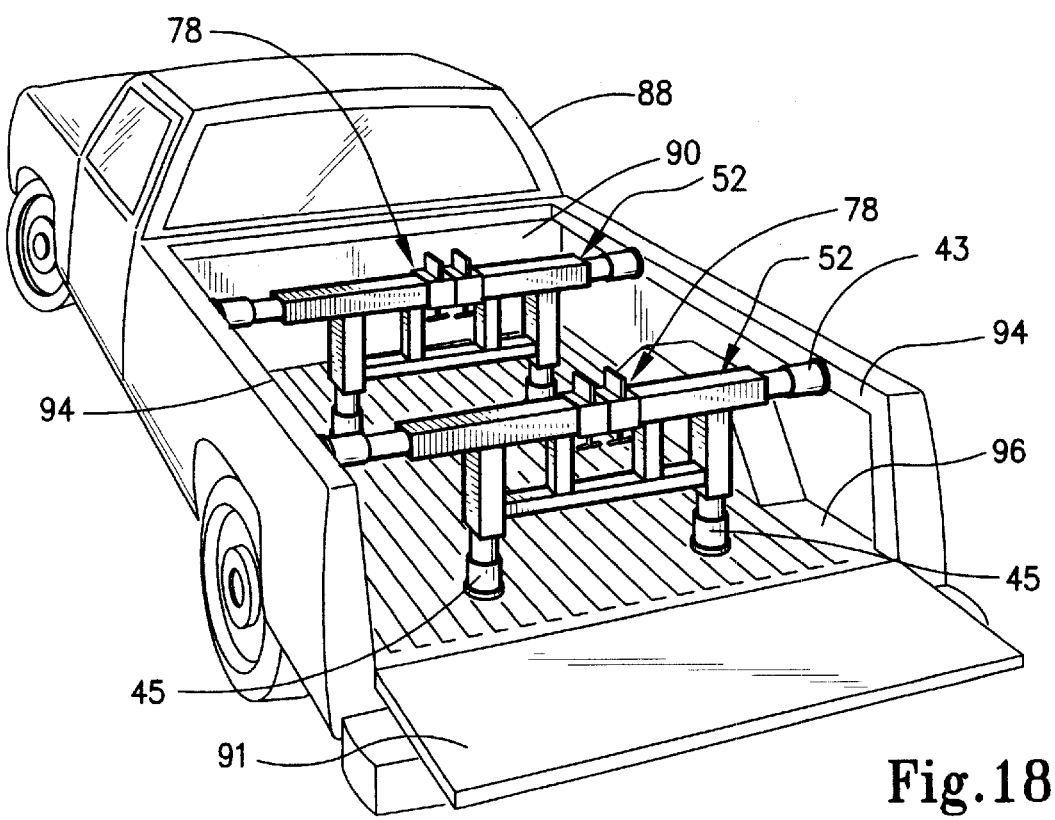
FIG. 18 is a perspective view of the fifth exemplary embodiment of the cargo retention device in use being mounted in a pickup truck bed with four cargo retention devices and with two cargo divider assemblies shown mounted to the frame structure of each cargo retention device.

Further to FIG. 17 shown is a perspective view of the fifth exemplary embodiment of the cargo retention device in use being mounted in a pickup truck bed with two cargo retention devices. An additional step can be added to include utilizing a plurality of cargo retention devices within a single cargo container. Each singular cargo retention device would be mounted in a like manner as disclosed in the FIG. 11 description with the additional cargo retention devices acting to further secure the cargo from movement within portions of the cargo container. Although, FIG. 17 shows a plurality of the fifth exemplary embodiment of the cargo retention devices 52 mounted in the cargo container, any of the disclosed embodiments of the cargo retention device could be used or even different embodiments could be used within a single cargo container. Similarly, looking to FIG. 18 is a perspective view of the fifth exemplary embodiment of the cargo retention device in use being mounted in a pickup truck bed with two cargo retention devices and with two cargo divider assemblies shown mounted to the frame structure of each cargo retention device. FIG. 18 essentially combines FIG. 17 with FIG. 15 in showing the cargo divider assemblies 78 being mounted on a pair of cargo retention devices for the purpose of showing the ability of the cargo retention device to support cargo that would be elevated off of the floor 96 of the cargo container such that the combination of the cargo divider assemblies 78 and the cargo retention devices 52 can support cargo in an axis parallel to the second extension member or in other words perpendicular to the floor 96 of the cargo container. This capability of being able to support cargo essentially on top of the cargo retention device is accomplished by the means to facilitate movement 45 for a length extension in the second extension member to allow the second extension member to contact and engage the floor 96 of the cargo container thus creating an ability for the cargo retention device to support a cargo load in an axis perpendicular to the floor 96 of the cargo container. Note that any of the embodiments disclosed of the cargo retainer device could be used in the same manner to support a cargo load in an axis that is perpendicular to the floor 96 of the cargo container, as all of the embodiments of the cargo retainer device include the means to facilitate movement 45 for the second extension member to contact and provide support on the cargo container floor, thus allowing a cargo load to be supported above the floor 96 of the cargo container.

Figure 19:
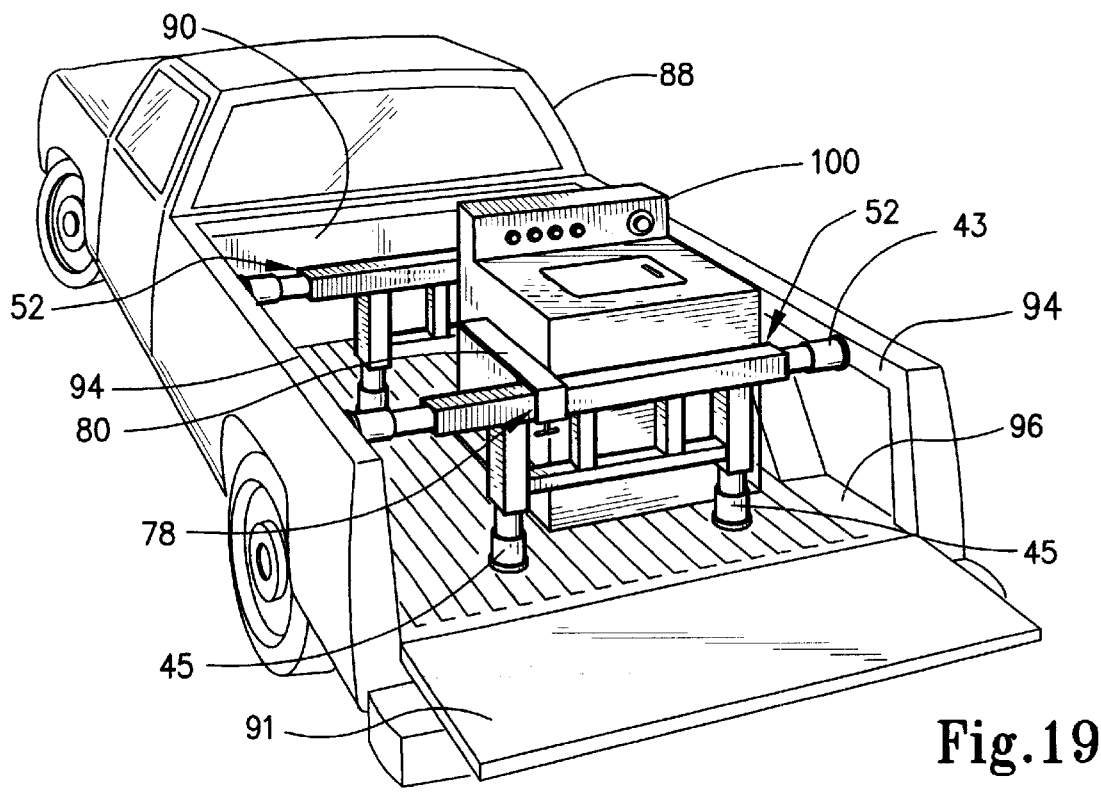
FIG. 19 is a perspective view of the fifth exemplary embodiment of the cargo retention device in use being mounted in a pickup truck bed with two cargo retention devices and a cargo divider assembly shown mounted to the frame structure of the cargo retention device securing a washing machine.

Looking to FIG. 19 shown is a perspective view of the fifth exemplary embodiment of the cargo retention device in use being mounted in a pickup truck bed with two cargo retention devices and a cargo divider assembly shown mounted to the frame structure of the cargo retention device securing a washing machine. Another adaptation of the cargo divider assembly 78 is shown with the extension 80 engaged to the first extension member to secure the cargo which is a washing machine 100 in this case against movement in an axis parallel to the first extension member, thus enabling the cargo 100 to be laterally secured in all four directions. Although, the fifth exemplary embodiment of the cargo retention device 52 is shown, the cargo divider assembly 78 could be used with any of the embodiments of the cargo retention device disclosed.

Figure 20:
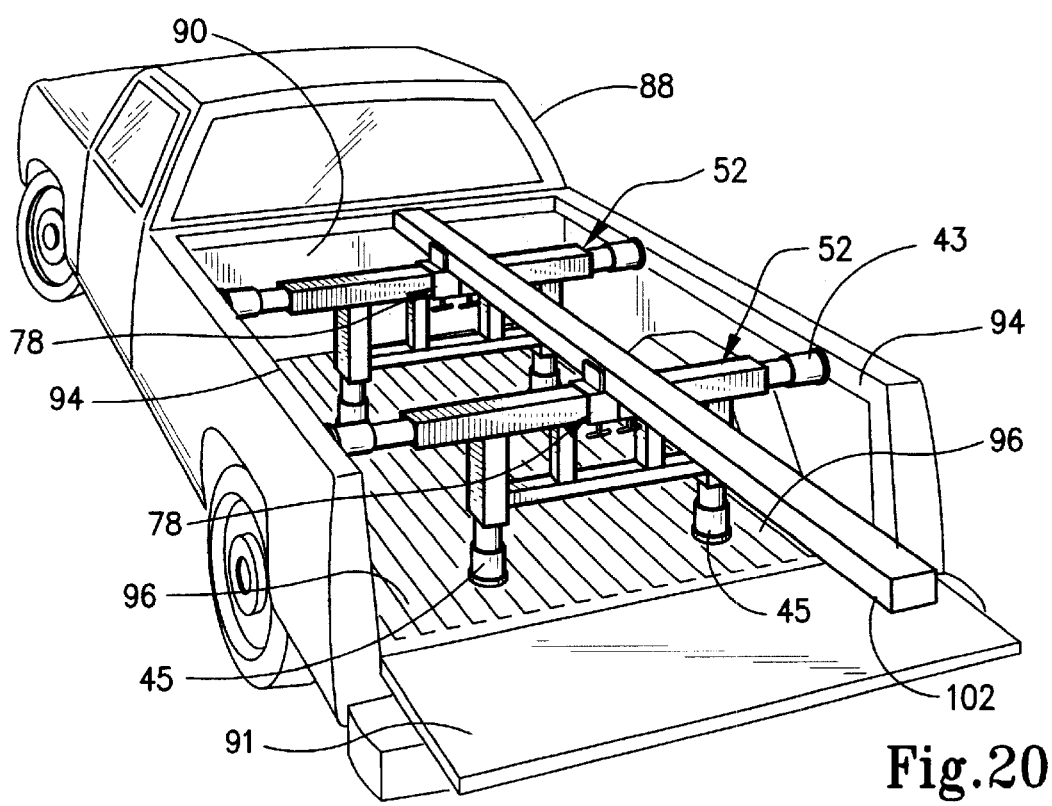
FIG. 20 is a perspective view of the fifth exemplary embodiment of the cargo retention device in use being mounted in a pickup truck bed with two cargo retention devices and with two cargo divider assemblies shown mounted to the frame structure of each cargo retention device securing a long piece of cargo.

Finally to FIG. 20 is a perspective view of the fifth exemplary embodiment of the cargo retention device in use being mounted in a pickup truck bed with two cargo retention devices and with two cargo divider assemblies shown mounted to the frame structure of each cargo retention device securing a long piece of cargo. Shown principally in FIG. 20 is the ability of the cargo retention device to support a long piece of cargo 102 above or elevated from the floor 96 of the cargo container which is enabled by the combination of the cargo divider assemblies 78 and the means to facilitate movement 45 for the second extension member to contact and provide support on the cargo container floor 96 thus allowing the cargo 102 to be supported on top of the cargo retainer device which creates the ability to secure and retain cargo that exceeds the size of the cargo container. This acts to protect the walls of the cargo container from wall top edge damage being the end wall 90 and an opposite parallel pivoted end wall 91, and the two opposite parallel side walls 94. In particular the pivoted end wall 91 being prevented from top edge damage due to the cargo 102 contacting and damaging the top edge of the pivoted end wall 91. Although, the fifth exemplary embodiment of the cargo retention device 52 is shown, the cargo divider assembly 78 in supporting the cargo 102 as shown could be used with any of the embodiments of the cargo retention device disclosed.

CONCLUSION

Accordingly, the present invention of a cargo retention device has been described with some degree of particularity directed to the embodiments of the present invention. It should be appreciated, though, that the present invention is defined by the following claims construed in light of the prior art so modifications the changes may be made to the exemplary embodiments of the present invention without departing from the inventive concepts contained therein.

What is claimed is:

1. A cargo retainer device adapted to be mounted within a cargo container that has an end wall, an opposite parallel pivoted end wall defining a container length therebetween, two opposite parallel side walls defining a container width therebetween, and a floor, said cargo retainer device adapted to be interposed between cargo placed in the container for shipment and either the end walls, side walls, and the floor to inhibit movement of the cargo during transit, said cargo retainer device comprising:
   (a) a first extension member including a first end and a second end, said first extension member having a lengthwise axis extending between said first and second ends;
   (b) a second extension member including a proximal end and an opposite distal end, said second extension member having an axial axis extending between said proximal and distal ends, said second extension member axial axis intersecting said first extension member lengthwise axis in an approximately perpendicular relationship such that said proximal end has an affixed connection to said first extension member between said first and second ends;
   (c) a means to facilitate movement of said first extension member along said lengthwise axis to increase the distance between said first and second ends such that said first and second ends engage opposing cargo container walls; and
   (d) a means to facilitate movement of said second extension member along said axial axis to increase the distance between said proximal and distal ends such that said distal end engages the cargo container floor.

2. A cargo retainer device according to claim 1 further including at least one additional said second extension member each said additonal second extension member including a proximal end and an opposite distal end, each said additional second extension member having an axial axis extending between the respective proximal and distal ends, each said additional second extension member axial axis intersecting said first extension member lengthwise axis in an approximately perpendicular relationship such that each respective said proximal end is adjacent to said first extension member between said first and second ends, each said additional second extension member engaging the cargo container floor on its respective said distal end.

3. A cargo retainer device according to claim 2 further including a first transverse frame member with a first edge and an opposing second edge, said first transverse frame member positioned substantially parallel to said first extension member and mounted in-between said second extension members such that said first edge and said second edge are each adjacent to a different said second extension member between a respective said proximal end and a respective said distal end.

4. A cargo retainer device according to claim 1 wherein said second extension member being affixed to said first extension member is accomplished by selecting from a group consisting of welding, brazing, or soldering.

5. A cargo retainer device according to claim 1 wherein said means to facilitate movement of said first extension member is accomplished by the use of screw threads.

6. A cargo retainer device according to claim 1 wherein said means to facilitate movement of said second extension member is accomplished by the use of screw threads.

7. A cargo retainer device according to claim 1 further including an anti slip element to engage the opposing parallel side walls, with said anti slip element on each of said first extension member first end and second end.

8. A cargo retainer device according to claim 1 further including an anti slip element to engage the container floor on said second extension member distal end.

9. A cargo retainer device according to claim 1 further including a lockable element that is adapted to engage said means to facilitate movement of said first extension member to secure said first extension member at a selectable distance between said first and second ends in a locked state and to allow said selectable distance between said first and second ends to be reduced in an unlocked state, wherein said lockable element in said locked state protects said cargo retainer device against unauthorized removal from the cargo container.

10. A cargo retainer device according to claim 1 further including a cargo divider assembly that is adapted to engage said first extension member such that a cargo divider assembly extension is approximately perpendicular to said first extension member lengthwise axis, wherein said cargo divider assembly acts to retain cargo in an axis parallel to said first extension member lengthwise axis.

11. A cargo retainer device according to claim 10 wherein said cargo divider assembly is adapted to support cargo elevated off of the floor of the cargo container such that said cargo divider assembly and said cargo retainer device support cargo in an axis parallel to said second extension member axial axis.

12. A cargo retainer device according to claim 1 further including a cargo net adapted to attach to said first extension member and said second extension member, said cargo net positioned to act as a retention barrier in-between opposing cargo container walls.

13. A cargo retainer device according to claim 1 wherein said first extension member and said second extension member are constructed of round structural tubing material.

14. A cargo retainer device according to claim 13 wherein said first extension member and said second extension member are constructed of materials selected from a group consisting of carbon steel, stainless steel, or aluminum.

15. A cargo retainer device according to claim 1 wherein said first extension member and said second extension member are constructed of square structural tubing material.

16. A cargo retainer device according to claim 15 wherein said first extension member and said second extension member are constructed of materials selected from a group consisting of carbon steel, stainless steel, or aluminum.

17. A cargo retainer device according to claim 15 wherein said means to facilitate movement of said first extension member and said means to facilitate movement of said second extension member further includes a threaded extension shaft adjacent to said first end with a mating threaded extension sleeve and a threaded extension shaft adjacent to said distal end with a mating threaded extension sleeve.

18. A cargo retainer device according to claim 17 wherein said extension shafts are detachable from said distal end and said first end.

19. A cargo retainer device according to claim 17 wherein said extension shafts are affixed to said distal end and said first end.

20. A cargo retainer device according to claim 19 wherein said extension shafts being affixed to said distal end and said first end is accomplished by selecting from a group consisting of welding, brazing, or soldering.

21. A cargo retainer device according to claim 3 further including a second transverse frame member with a first termination point and an opposing second termination point, said second transverse frame member positioned substantially parallel to said second extension members and mounted in-between said first extension member and said first transverse frame member such that said first termination point is adjacent to said first extension member and said second termination point is adjacent to said first transverse frame member.

22. A cargo retainer device according to claim 21 further including a second transverse frame extension member having a first tip and an opposite second tip, said second transverse frame extension member positioned to be approximately parallel to said second extension members with said first tip being adjacent to said first transverse frame member and said second tip being cantilevered.

* * * * *